United States Patent [19]
Gilliland

[11] Patent Number: 4,896,018
[45] Date of Patent: Jan. 23, 1990

[54] METHOD AND APPARATUS FOR PROTECTING A POWER TRANSISTOR FROM EXCESSIVE CURRENT FLOW

[76] Inventor: Malcolm T. Gilliland, 310 Pine Valley Rd., Marietta, Ga. 30067

[21] Appl. No.: 62,543

[22] Filed: Jun. 12, 1987

Related U.S. Application Data

[63] Continuation-in-part of Ser. No. 791,224, Oct. 25, 1985, Pat. No. 4,716,274.

[51] Int. Cl.[4] ............................................. B23K 9/10
[52] U.S. Cl. ........................ 219/137 PS; 219/130.32; 363/56
[58] Field of Search .......... 219/137 PS, 130.1, 130.51, 219/130.21, 130.31, 130.32, 130.33; 363/56

[56] References Cited

U.S. PATENT DOCUMENTS

| | | | |
|---|---|---|---|
| 3,721,836 | 3/1973 | Rippel | 363/56 |
| 4,396,823 | 8/1983 | Nihei et al. | 219/137 PS |
| 4,409,465 | 10/1983 | Yamamoto et al. | 219/137 PS |
| 4,716,274 | 12/1987 | Gilliland | 219/130.21 |

*Primary Examiner*—Clifford C. Shaw
*Attorney, Agent, or Firm*—Jones, Askew & Lunsford

[57] ABSTRACT

An improved electronic welding station is disclosed. The welding station provides for an improved arc striking capability by providing a higher arc striking voltage and a large arc striking current and, once the arc is struck, automatically switches over to preselected parameters for conducting the welding operation. Also disclosed are a method for preventing transistor failure due to loads which tend to cause a very large instantaneous current flow and an apparatus for protecting the driver circuit and the remaining output transistors in the event that one of the output transistors should suffer a collector-to-base short. The welding station also describes a method of operating the cooling fan at a speed commensurate with the cooling requirements and periodically reversing the voltage to the cooling fan so as to extend the operating lifetime of the fan brushes. The welding station also has several shutdown circuits which protect the components of the welding station in the event of cooling fan failure or excessive heating of the weld station. The welding station also provides for a shutdown period for cooling off in the event that the maximum allowable instantaneous current is exceeded.

63 Claims, 10 Drawing Sheets

METHOD AND APPARATUS FOR PROTECTING A POWER TRANSISTOR FROM EXCESSIVE CURRENT FLOW

TECHNICAL FIELD

This is a continuation-in-part of U.S. patent application Ser. No. 791,224, filed Oct. 25, 1985, by Malcolm T. Gilliland entitled "Distributed Station Welding System", now U.S. Pat. 4,716,274, issued Dec. 29, 1987. The present invention relates to improvements in an arc welding station.

BACKGROUND OF THE INVENTION

The present invention describes improvements to the weld selector stations described in the above patent application. The improvements also are applicable to other electronic welders which use a plurality of paralleled transistors to provide the desired output current and/or which use different striking and welding voltages.

In welding and other power systems which provide a high current capability, a number of transistors are generally operated in parallel, with emitter resistors for current balancing, to provide the required output current. However, catastrophic failures, involving some or all of the output transistors, sometimes occur. This type of catastropic failure usually results from an unusually large current surge which destroys first one transistor and then, by a chain reaction, causes the destruction of some or all of the remaining transistors. In the past, it was generally believed that the failure was caused by the large current destroying the emitter-base or the base-collector junction of the first transistor. However, it has been found that the failure of the first transistor is not always due primarily to the failure of the junctions but can be attributed to failure of the bonding wire between the emitter and the external connection to the power transistor. During large current surges, the transistor junctions are, to some degree, protected from failure by over heating because of the relatively large thermal mass of the junction and the high thermal conductivity between the junction, substrate, and heat sink. However, the emitter bonding wire has very little thermal mass and the thermal conductivity between the emitter bonding wire and the heat sink is very low. Therefore, the large current surge overheats the emitter bonding wire and causes a failure by causing the emitter bonding wire to melt through, detach from the emitter bonding pad, or detach from the emitter contact. The net result is that the emitter is suddenly opened, the $V_{CBO}$ rating of the transistor is exceeded, and the collector-base junction of the transistor breaks down. The failure of the collector-base junction of the first transistor applies the full collector voltage to the bases of the remaining transistors. This, in turn, prevents the remaining transistors from being turned off. These remaining transistors, in turn, draw large currents, overheat, and fail. Therefore, there is a need for a method of preventing current surges of such magnitude as to melt or detach the emitter bonding wire. Furthermore, there is a need for an apparatus to protect the other parallel transistors in the event that the collector-to-base junction of a first transistor fails.

Also, the voltage and current produced by the collector-base junction failure frequently overloads the driver circuit, thereby causing the driver circuit to be destroyed. There is therefore a need for a method of preventing destruction of the driver circuit in the event of a failure of one or more of the output transistors.

The weld selector station described in U.S. patent application Ser. No. 791,224 describes a peak current detector which, if the instantaneous current exceeds a predetermined value, interrupts the drive to the power transistors until the reason for the excessive current is corrected. However, in some situations, where the reason for the excessive current is correctable but persistent, the repeated periodic surges of the excessive current can cause overheating of the power transistors. Therefore, there is a need for an apparatus to protect the power transistors from overheating caused by repeated, excessive current flows.

Electronic welders, and many non-electronic welders, have a cooling fan to prevent the components of the welder from overheating in normal use. These fans generally have a DC motor since only DC power is available. These fan motors are generally conventional DC motors in that they have a pair of brushes, one for the positive terminal and one for the negative terminal. As these brushes wear, they must be periodically replaced or the fan will fail and the components of the welder will overheat. Generally, the brush connected to the positive terminal wears faster and, when it is replaced, there is frequently a substantial amount of brush left connected to the negative terminal. However, these brushes are generally replaced as a pair. It has been found that the time between replacement of the pairs of brushes can be extended if, periodically, the positive and negative terminals to the fan are reversed so that, alternately, a particular brush is connected to the positive voltage supply and then to the negative voltage supply. Therefore, there is a need for an apparatus for periodically reversing the polarity of the voltage applied to the fan motor.

The speed at which the fan operates also effects the lifetime of the brushes; high fan speeds mean shorter life and vice versa. Typically, the cooling fan has only one speed. However, the components of the welder generally require full cooling only when welding is actually being performed and can operate with reduced cooling between welding operations. Therefore, running the fan at high speed when welding operations are actually in progress and running the fan at a lower speed at other times will increase the lifetime of the brushes. Therefore, there is a need for an apparatus which will operate the cooling fan at high speed when welding operations are in progress and at a lower speed at other times.

A cooling fan failure will often go unnoticed by the welder because of the ambient noise level. However, when the cooling fan fails, the heat generated by welding operations and, in some cases, by a standby mode, can cause the components of the welding station to overheat and fail. Therefore, there is a need for an apparatus which automatically shuts down the welding station in the event that the cooling fan fails.

Even if the cooling fan is fully operational, if the air flow into the welding station is blocked or restricted, the ambient temperature is excessively high, and/or the particular welding operation causes an excessive amount of heat to be generated by the components of the welding station, the internal components of the welding station will overheat and fail. Therefore, there is a need for an apparatus which monitors the temperature inside the welding station and disables the welding station in the event that the internal temperature becomes excessively high.

During normal usage, the tip of the welding rod may become dirty or deformed, such as with a ball of metal on the end as opposed to a sharply truncated tip. In such cases, the striking and arc characteristics will be irregular until such time as the dirt or deformity is removed. It has been found that this dirt or deformity can be removed by applying a large current surge to the welding rod at the time the arc is first struck. This large current destroys the dirt or deformity at the end of the welding rod. Therefore, there is a need for an apparatus for applying a large current surge to the welding rod at the time of striking the arc so as to remove any dirt or deformity at the end of the welding rod. Summary of the Invention The present invention describes methods and apparatus for constructing an improved weld selector station which meets the needs described above. Generally stated, the present invention describes improvements which prolong the lifetimes of the components of the welding station and provide for improved striking and operating characteristics.

More particularly described, the present invention describes a method of operating the power transistors to prevent emitter bonding wire failure, and an apparatus to prevent chain reaction failures of the paralleled power transistors.

Also more particularly described, the present invention describes an apparatus for periodically reversing the operating voltage of the cooling fan and automatically adjusting the speed of the cooling fan in response to operating conditions so as to prolong the life of the brushes on the cooling fan.

Also more particularly described, the present describes an apparatus for shutting down the weld selector station in the event that the cooling fan fails or the internal temperature of the weld selector station becomes excessive.

Also more particularly described, the present invention describes an apparatus for optimizing the output of the welding station for both striking and welding conditions.

Therefore, it is an object of the present invention to provide an improved welding station which is less susceptible to failures of the emitter bonding wire and less susceptible to chain reaction catastrophic failures.

It is a further object of the present invention to provide a weld selector station having an improved fan brush lifetime by operating the cooling fan in a manner which prolongs the life of the fan brushes.

It is another object of the present invention to provide a weld selector station which provides improved protection for its internal components by automatically shutting down in response to excessively large currents, an excessive internal temperature, and/or a failure of the cooling fan.

That the present invention accomplishes these and other objectives and meets the needs described above will be apparent from the detailed description of the preferred embodiment.

Brief Description of the Drawings

FIG. 1 is a block diagram of the preferred embodiment of the present invention. An external DC power supply (not shown) is connected to apply a positive voltage to the $V_{IN}$ terminal and a negative voltage to the GROUND IN terminal. The output of weld selector station 16 is taken from output terminal 717 and GROUND OUT terminal 19. Weld selector station 16 has the following major components: power and trigger circuit 702, shunt circuits 50a–50d, arc sustaining resistor 45, a plurality of power transistor circuits 55a–55f, transistor protection circuit 707, high/low voltage switchover circuit 86, short circuit detector 72, over current detector 73, peak current detector 80, STICK & TIG control 30, low frequency pulse modulator 32, high frequency pulse modulator 34, switching, shutdown and driver circuit 37, and circuit power supplies 38. With the exception of power and trigger 702, and transistor protection circuit 707, the operation of the other primary components is essentially the same as described in patent application Ser. No. 791,224.

Figure 1:
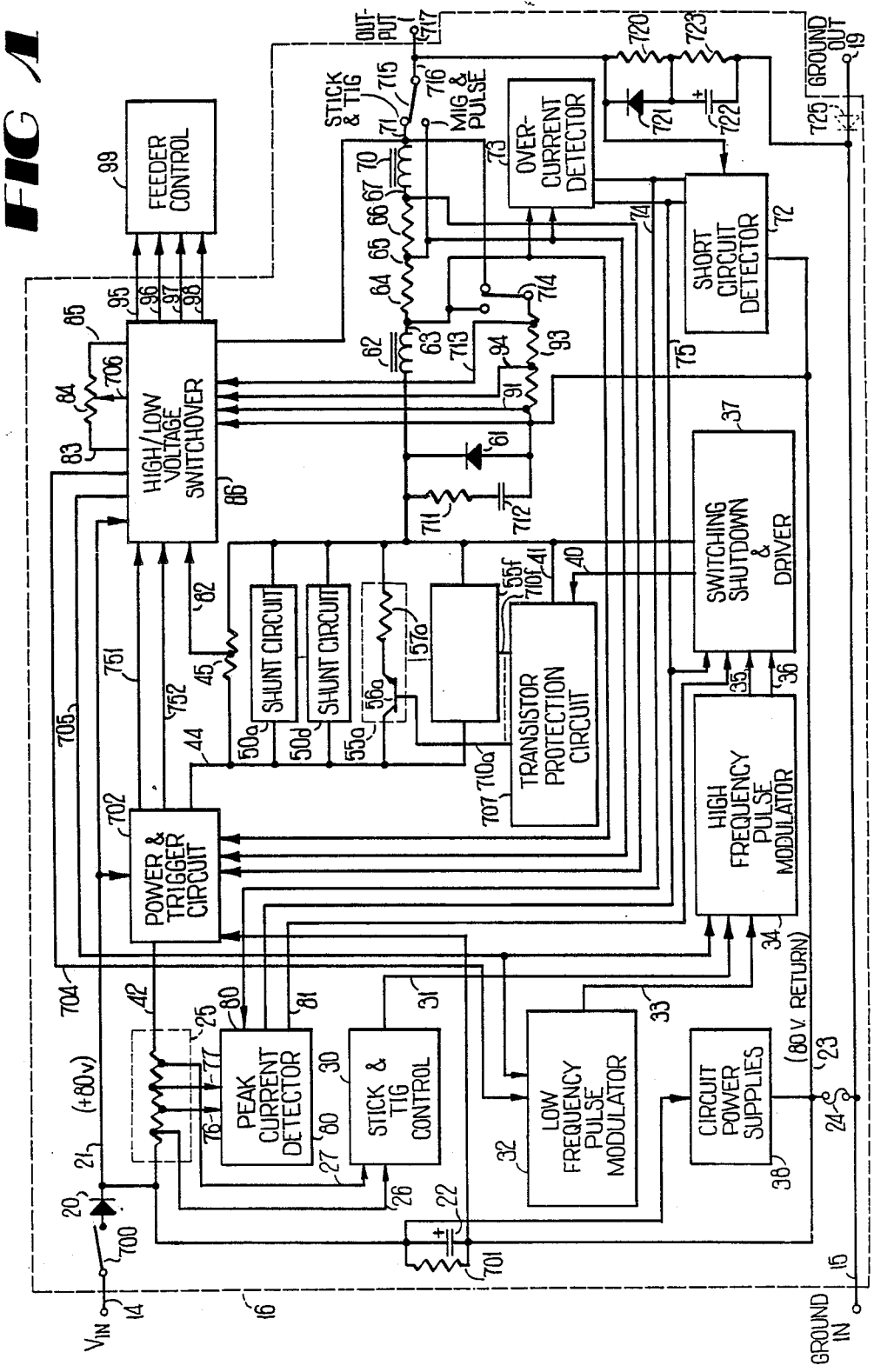
FIG. 1 is a block diagram of the improved weld selector station of the preferred embodiment.

The $V_{IN}$ terminal is connected by conductor 14 and on/off switch 700 to the anode of reverse protection diode 20. The anode of diode 20 is connected to conductor 21 which is the plus 80 volt supply for most of the components. As will be explained in more detail later, power and trigger circuit 702 provides operating power to the transistor circuits 55a–55f and also shuts down weld selector station 16 in the event of fan failure or overheating. Shunt circuits 50a–50d protect transistors 56a–56f from transient voltages when transistors 56a–56f are switching from the on condition to the off condition. In a typical welding operation, transistors 56a–56f will be rapidly switched on and off so as to maintain the desired arc and deposition rate characteristics. Arc sustaining resistor 45 provides a limited current flow when transistors 56a–56f are off so that the arc will be sustained and not quenched. The output of arc sustaining resistor 45, shunt circuits 50a–50d, and transistor circuits 55a–55f are connected to output terminal 717 through a first inductor 62, a first resistor 64, and, selectively, through a second, variable resistor 66 and a second, variable inductor 70. Switch 715 allows the welder to select whether resistor 66 and inductor 70 are placed in series with the output on terminal 717. Typically, resistor 66 and inductor 70 will be used when additional current limiting features are required, such as when low frequency pulse modulator 32 is set to a low frequency. Resistor 46 and inductor 70 are made variable so that, for situations wherein the combination of inductor 62 and resistor 64 provides insufficient current limiting but the combination of inductors 62 and 70 and resistors 64 and 66 provide too much current limiting, resistor 66 and inductor 70 may be adjusted to provide a desired degree of current limiting. This allows the welder to adjust resistor 66 and inductor 70 and position switch 715 to obtain the arc characteristics most desirable for the type of welding being conducted.

Flywheel diode 61 protects transistors 56a–56f from reverse voltages caused by inductor 62 and/or inductor 70 and, by conducting and blowing fuse 24, protect the weld selector station 16 from the inadvertent application of the negative power supply lead to output terminal 717. A 2.5 ohm resistor 711 and a 0.22 microfarad capacitor 712, connected in series, are placed in parallel with flywheel diode 61. Resistor 711 and capacitor 712 perform two functions: acting as a snubber circuit to protect flywheel diode 61; and, when weld selector station 16 is first turned on, conducting a sufficient amount of current through arc sustaining resistor 45 to trigger peak current detector 80. When peak current detector 80 is triggered, it shuts down some of the circuits of station 16 for three minutes. The components of weld selector station 16 are therefore allowed a three minute time to stabilize. Also, in the event of a peak current in excess of the preset value, weld selector station 16 is shut down for a three minute period to allow transistors 56a–56f and other circuits to cool down to normal operating temperature.

A 1,000 ohm resistor 701 is placed in parallel with capacitor 22. Resistor 701 provides discharge path for capacitor 22 in the event that power is turned off via switch 700, or interrupted via the blowing of fuse 24. Resistor 701 is added as a safety feature and does not otherwise affect the operation of weld selector station 16.

Connected between output terminal 717 and ground in conductor 15 is a striking assist circuit composed of two series circuits. The first series circuit is the combination of reverse biased diode 721 in parallel with 10 ohm resistor 720. The second series circuit is 30,000 microfarad capacitor 722 in parallel with 1,000 ohm bleeder resistor 723. The striking assist circuit insures a good initial strike and arc, even when the tip of the welding rod is dirty or deformed, by providing a large current surge at the instant the arc is struck. Prior to the arc being struck, capacitor 722 charges through resistor 720 to the voltage on output terminal 717, nominally 80 volts. When the arc is struck, capacitor 722 discharges through diode 721 and the arc. Because of the size of capacitor 722, the initial current surge, when the arc is first struck, is sufficiently large to disintegrate any dirt or deformities on the welding rod and also prevents the arc from starting and them immediately quenching due to irregularities on the work surface. The striking assist circuit, other than assisting in striking the arc, does not otherwise affect the operation of station 16. Bleeder resistor 723 provides, for safety purposes, an alternate discharge path for capacitor 722.

Optional diode 725, shown in phantom, is not necessary for the operation of selector station 16 but provides an additional feature to protect against the misapplication of the supply voltage to the weld selector station 16. If, for example, the negative supply lead is inadvertently connected to the GROUND OUT terminal 19 and the positive supply lead connected to the $V_{IN}$ terminal, the GROUND IN terminal or output terminal 717, diode 725 will be reversed biased and prevent this incorrect application of the supply voltage from adversely affecting the welding power supply or weld selector station 16.

Figure 2:
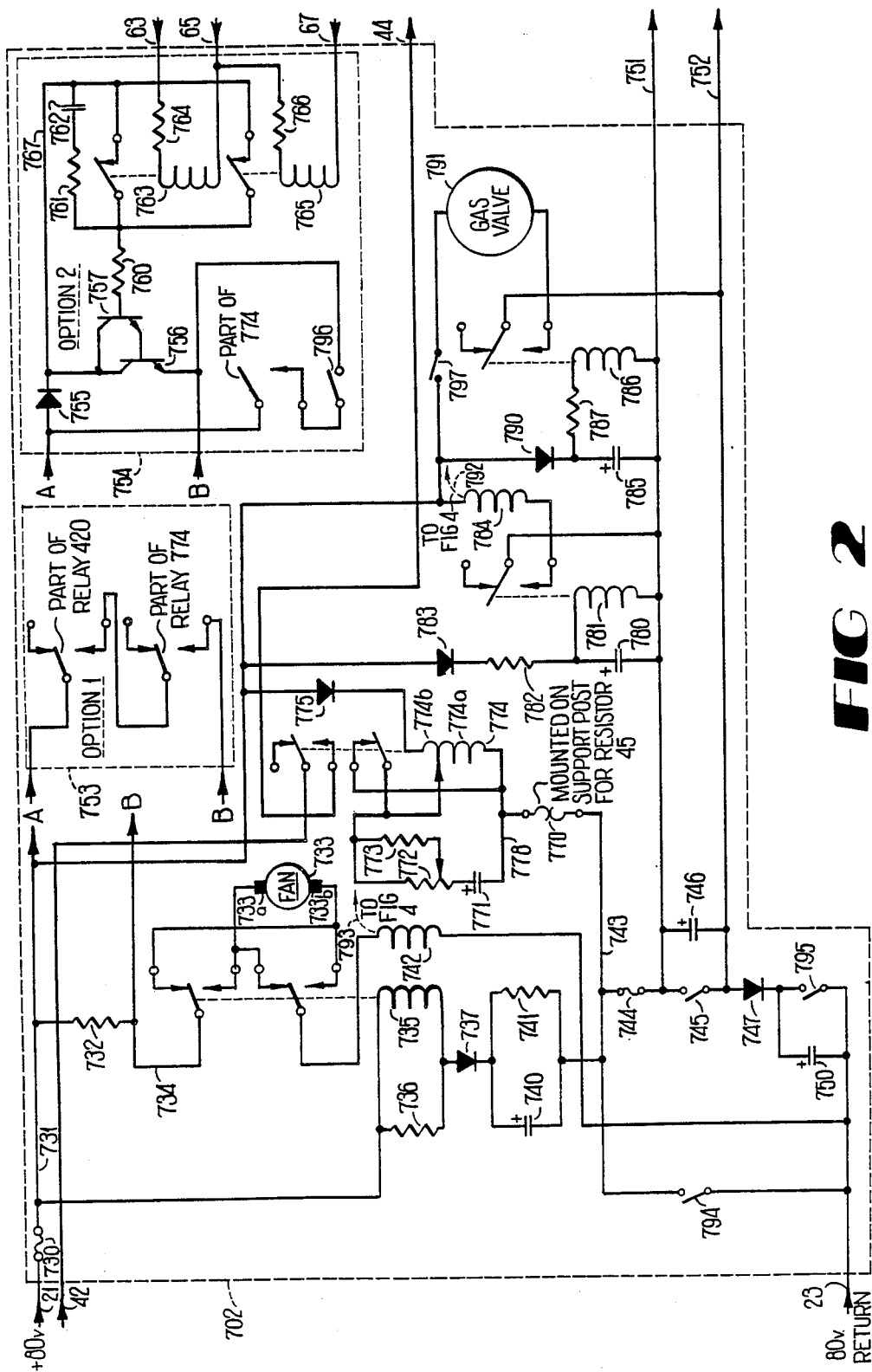
FIG. 2 is a schematic diagram of the power and trigger circuit of the preferred embodiment.

Turn now to FIG. 2, which is a schematic diagram of power and trigger circuit 702. Eighty volt conductor 21 is connected to conductor 731 via 5 amp fuse 730. In the event of a short in circuit 702, fuse 730 will blow thereby interrupting power to circuit 702 and shutting down weld selector station 16. Conductor 731 is connected by the parallel combination of 25 kilohm resistor 736 and the coil of latching relay 735 to the anode of diode 737. The cathode of diode 737 is connected by the parallel combination of 40 microfarad capacitor 740 and 5 kilohm resistor 741 to conductor 743. Conductor 743 is selectably connected to 80 volt return conductor 23 through switch 794. Conductor 743 is also connected to conductor 751 through 751 through fuse 744. Conductor 751 is selectably connected to conductor 752 via trigger switch 745, which is bypassed by capacitor 746. Conductor 752 is connected to the anode of diode 747. The cathode of diode 747 is selectably connected to 80 volt return conductor 23 via switch 795, which is bypassed by capacitor 750.

In the preferred embodiment, latching relay 735, such as the Potter & Brumfield KUR-11D11 24VDC impulse relay, has two sets of single-pole, double-throw contacts. The normally closed contact of the first set and the normally open contact of the second set are connected to brush 733b of fan 733. The normally open contact of the first set and the normally closed contact of the second set are connected to brush 733a of fan 733. The center contact of the second set is connected to 80 volt return conductor 23 through fan failure relay 742. Fan failure relay 742 is connected to FIG. 4 as shown by dashed line 793. The center contact of the first set is connected to 80 volt conductor 731 via a 135 ohm resistor 732.

First consider the polarity reversing effects of latching relay 735. Each time switch 794 or the combination of switches 745 and 795 is operated to connect conductor 743 with 80 volt return conductor 23, capacitor 740 will provide a momentary current path for relay 735, which will cause relay 735 to advance to its alternate latching position. Then, when switches 794, 745 and 795 are positioned so that conductor 743 is isolated from conductor 23, resistor 741 will discharge capacitor 740 so that the next time the switches are closed capacitor 740 will provide another current pulse to advance relay 735 to its next latching position. From an inspection of the wiring connection to the contacts of relay 735 it will be appreciated that, upon each operation of relay 735, the voltage applied to fan 733 is reversed in polarity so that, ideally, brushes 733a and 733b each spend a similar amount of time connected to the positive supply voltage and the wear on brushes 733a and 733b is more uniform. Diode 737 prevents negative transients on conductor 731 from activating relay 735. Resistor 736 provides a shunt path for the coil of relay 735 to discharge when conductor 743 is isolated from 80 volt return conductor 23.

In order to further extend the lifetime of brushes 733a and 733b, fan 733 is selectably operated at a high or a low cooling speed. In the low cooling speed, resistor 732 is connected in series with fan 733 thereby reducing the operating the voltage to fan 733, reducing its speed, and reducing the wear on brushes 733a and 733b. However, when full cooling is required, resistor 732 is bypassed so that fan 733a receives full voltage and operates at maximum speed. Two options, 753 and 754, are shown which selectably bypass resistor 732 and provide full voltage to fan 733.

In the first option 753, resistor 732 is connected in parallel with the series combination of a normally open set of contacts of relay 420 and a normally open set of contacts of relay 744. When both relay 420 and relay 774 are activated, resistor 732 is bypassed and fan 733 receives full operating voltage. The operation of relay 420 is described in conjunction with FIG. 8. Relay 420 is energized only when welding is actually in progress and is de-energized during the arc striking period and when welding is not in progress. As will be shown below, relay 774 is energized during arc striking and actual welding operations and is de-energized only when switches 794, 745 and 795 are positioned such that conductor 743 is isolated from 80 volt return conductor 23.

In the second option 754, resistor 732 is selectably bypassed by transistors 756 and 757 and diode 755 or by switch 796 and a set of contacts of relay 774. In this option, conductor 734 is connected to the emitter of transistor 756. Transistors 756 and 757 are connected in a Darlington configuration. The collectors of transistor 756 and 757 are connected to the cathode of diode 755. The anode of diode 755 is connected to conductor 731. The base of transistor 757 is connected to the cathode of diode 755 through resistor 760 and a parallel switching circuit formed by the normally open contacts of relays 763 and 765. If any one of relays 763 or 765 is activated then transistors 756 and 757 will be turned on and resistor 732 will be bypassed, thereby applying full operating voltage to fan 733. The parallel combination of the contacts for relays 763 and 765 is bypassed, to reduce noise impulses on the base of transistor 757, by a shunt circuit consisting of resistor 761 in series with capacitor 762. Diode 755 prevents negative transients on conductor 731 from adversely affecting transistors 756 and 757.

Conductor 63 is connected to one end of the coil of relay 763 through resistor 764. The other end of the coil of relay 763 is connected to conductor 65. Conductor 65 is also connected one of coil 765 through resistor 766. The other end of the coil of relay 765 is connected to conductor 67. In the preferred embodiment, relay 763 and 765 are reed relays. Relays 763 and 765 are responsive to the voltage drop across, and therefore the current through, resistors 64 and 66, respectively, of FIG. 1. Therefore, when a welding operation begins and current flows through resistors 64 and/or 66, relays 763 and/or 765 will close, thereby activating transistors 756 and 757, shunting resistor 732, and providing full operating voltage to fan 733. Resistors 764 and 766 are used to prevent excessive current flow in relays 763 and 765. Also, resistor 732 is bypassed and fan 733 operates at full speed when relay 774 is activated if switch 796 is closed. In the preferred embodiment switch 796 is closed if MIG operations are being performed.

Of course, for proper cooling, fan 733 must run in the same direction, such as clockwise, regardless of the polarity of the applied voltage. Therefore, if polarity reversal is used, a permanent magnet fan is inappropriate and, in the preferred embodiment, a DAYTON 2M277 AC motor is used for fan 733.

Relay 774 selectively provides operating power to transistors 56a–56f of FIG. 1. Relay 774 has several sets of contacts. Conductor 42 is connected to the center contact of a first set of contacts on relay 774. The normally open contact of this set is connected to conductor 44. When relay 774 is activated operating power is then provided to the power output transistors 56a–56f of FIG. 1. Conductor 731 is connected to the anode of reverse voltage blocking diode 775. The anode of diode 775 is connected to one end of the coil of relay 774. In the preferred embodiment, relay 774 has two windings: one winding is used for initially pulling in the contacts, and both windings are used to hold the contacts in. Coil 774a has a resistance of approximately 3,000 ohms and coil 774b has a resistance of approximately 75 ohms. When relay 774 is not energized, coil 774a is bypassed so that a large current flows through coil 774b and rapidly pulls in the contacts. However, once the contacts are pulled in coil 774a is no longer bypassed and the total resistance of coil 774 is approximately 3,000 ohms. Therefore, relay 774 has a high pull in current and a low hold in current.

Conductor 731 is connected to the anode of reverse voltage blocking diode 775. the cathode of diode 775 is connected to one end of coil 774b. The other end of coil 774b is connected to one end of coil 774a, one end of potentiometer 772, one end of resistor 773, and the center contact of a single pole single throw normally closed set of contacts on relay 774. The other end of coil 774a is connected to the normally closed contact of the above set of contacts and to one end of capacitor 771. The other end of capacitor 771 is connected to the other end of potentiometer 772. The wiper contact of potentiometer 772 is connected to the other end of resistor 773. Conductor 778 is connected one end of a thermostatically controlled circuit breaker 770. The other end of circuit breaker 770 is connected to conductor 743.

Consider now the operation of relay 774. Assume first that switches 794, 795 and 745 are positioned such that conductor 743 is not connected to 80 volt return conductor 23. Relay 774 will be de-energized, and the contacts will be positioned such that coil 774a is bypassed. Assume now that one or more of the switches is closed so as to connect conductors 743 and 23. The full 80 volt potential on conductor 731 will be applied across coil 774b thereby providing a large amount of current to cause rapid pull in. As soon as relay 774 pulls in the first set of contacts will open and coil 774a will no longer be bypassed thereby raising the resistance of the coil of relay 774 from 75 ohms to approximately 3,000 ohms and reducing the current through the coil of relay 774 to a much smaller value. However, this value is still more than sufficient to keep relay 774 pulled in. Also, once relay 774 pulls in, capacitor 771 will begin charging through potentiometer 772 and resistor 773.

Assume now that switches 794, 795 and 745 are operated so that conductor 743 is isolated from conductor 23. Capacitor 771 will then begin discharging through potentiometer 772, resistor 773 and coil 774a. Capacitor 771 therefore provides a delay period before coil 774 drops out. This delay period can be adjusted by potentiometer 772. Therefore, relay 774, in conjunction with capacitor 771, potentiometer 772 and resistor 773 provides a fast pull in, slow drop out relay system for providing operting power to transistors 56a–56f.

It will be recalled that another set of contacts of relay 774 are present in the two options, 753 and 754, for adjusting the speed of cooling fan 733. Therefore, when relay 774 is energized so as to provide operating power to power transistors 56a–56f, fan 733 receives the full operating voltage and operates at its maximum cooling capacity.

Thermostatically controlled circuit breaker 770 is preferably mounted on the support post for arc sustaining resistor 45 of FIG. 1. In the event that the temperature of resistor 45 becomes excessive, such as might happen if switch 794 is closed and the welding head is placed in contact with a ground, the temperature of resistor 45 would increase, thereby causing circuit breaker 770 to open, de-energizing coil 774, and removing operating voltage from resistor 45 and transistors 56a–56f until the temperature of resistor 45 had returned to an acceptable level.

Conductor 731 is connected to the anode of a reverse voltage blocking diode 783 and to one end of the coil of motor control relay 784. The cathode of diode 783 is connected through resistor 782 to the parallel combination of capacitor 780 and the coil of relay 781. The other end of capacitor 780 and coil of relay 781 is connected to conductor 751. The other end of the coil of motor relay 784 is connected to the normally open contact of relay 781. The center contact of relay 781 is also connected to conductor 751. Motor relay 784 controls the operation of the feed motor in the welding head. Dashed line 792 indicates the connection between motor relay 784 and the contacts for relay 784 in FIG. 8. If switches 794, 795 and/or 745 operate at such that conductor 743, and therefore conductor 751, are connected to conductor 23, then relay 781 and therefore relay 784 will be activated. Likewise, if the switches are operated such as to isolate conductor 751 from conductor 23 then relays 781 and 784 will be de-energized. Resistor 782 is a voltage step down resistor so as to allow 24 volt relay 781 to operate from the 80 supply. Capacitor 780 provides a delay drop out time for relays 781 and 784 so that the feeder motor will continue operating for a short period after the switches are open.

Conductor 731 is also connected to the anode of reverse voltage blocking diode 790 and, through switch 797, to one terminal of gas valve 791. The cathode of diode 790 is connected to one end of capacitor 785 and one end of resistor 787. The other end of resistor 787 is connected to one of the coil of relay 786. the other end of capacitor 785 and the other end of the coil of relay 786 are connected to conductor 751. The other terminal of gas valve 791 is connected to the normally open contact of relay 786. The center contact of relay 786 is connected to conductor 752. Resistor 787 is a voltage step down resistor which allows relay 786 to operate from the 80 volt supply. Capacitor 785 provides a discharge path and a controlled drop out time for relay 786. Note that, in order to activate gas valve 791, switches 745 and 797 and either switch 794 or switch 795 must be closed. It will be recalled that switch 745 is the trigger switch on the welding head. If switch 745 is open then relay 786 will be de-energized and gas valve 791 will be closed. However, if switch 745 and either switch 794 or switch 795 are closed, then relay 786 will be activated and gas valve 791 will be energized. Switch 797 is closed when shielding gas is desired, such as for MIG and TIG operations, and opened when shielding gas is not desired, such as for STICK operations.

From the above, it will be appreciated that power and trigger circuit 701 provides numerous features which protect the equipment from abuse or excessive temperature conditions and provide controlled drop out times which assist in assuring that the termination point of the weld being made is a good weld and is not irregular in any manner.

Figure 3:
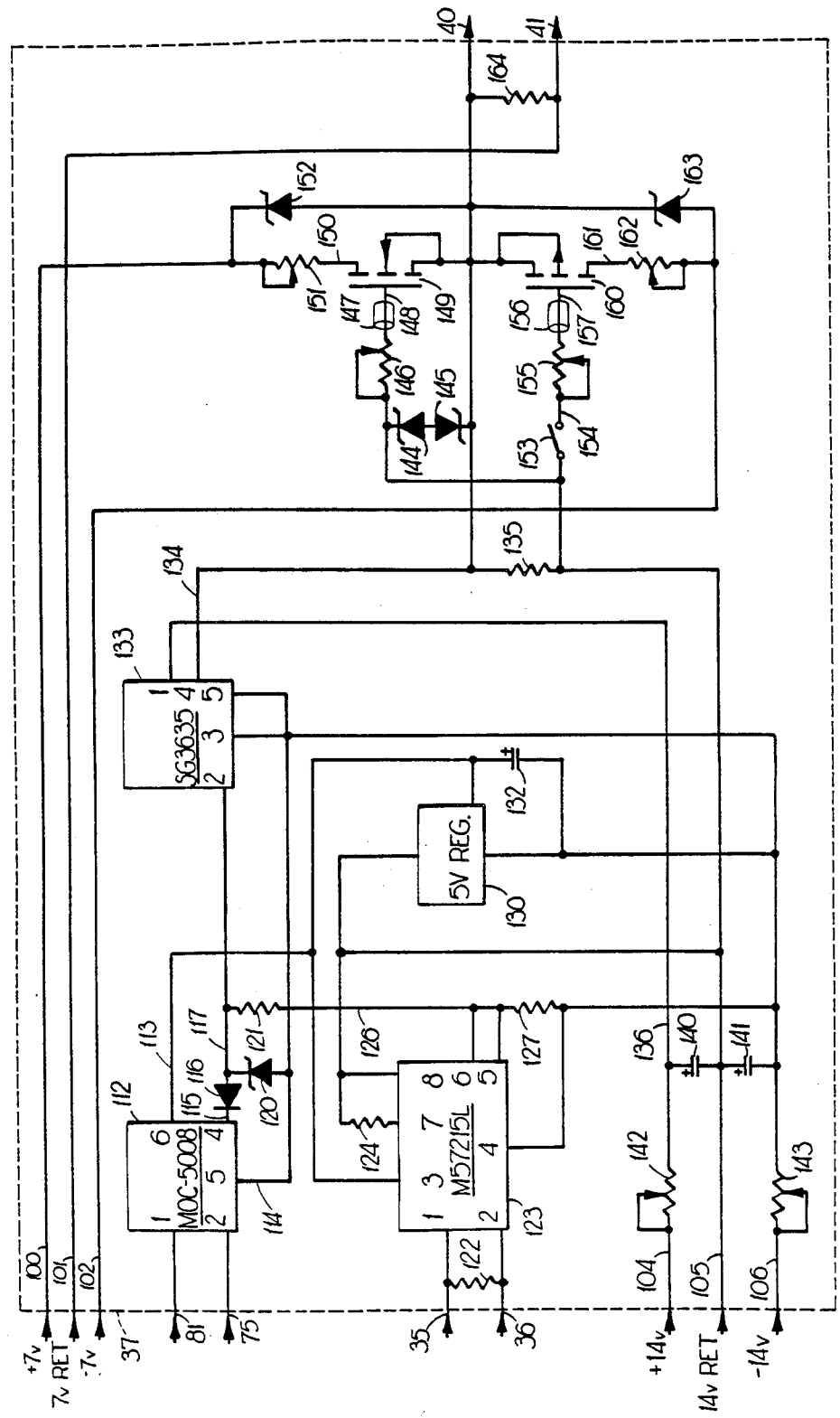
FIG. 3 is a schematic diagram of the switching and shutdown driver of the preferred embodiment.

Turn now to FIG. 3 which is a schematic diagram of switching, shutdown and driver circuit 37. The construction and operation of switching, shutdown and driver circuit 37 is the same as described in patent application Ser. No. 791,224, with two exceptions. The first exception is that conductor 81 is directly connected to pin 1 of optoisolator 112 instead of, as in the former circuit, being connected through a resistor. The resistor has not been eliminated entirely, but has been moved to FIG. 4 for clarity.

The second difference is the setting of potentiometer 151. Previously, potentiometer 151 was set so as to allow transistors 56a–56f to remain in saturation for a given emitter current. However, as described in the background, transistors 56a–56f were subject to occasional failure due to burn through or detachment of the emitter bonding wire on these transistors. In the preferred embodiment, potentiometer 151 is adjusted so that transistor 56a–56f operate slightly out of the saturated region and into the active operating region. Of course, in this mode of operation the power dissipation of transistors 56a–56f is slightly greater but well within their ratings. The protection mechanism is as follows. Previously, potentiometer 151 was set to assure that the transistors remained in saturation. Therefore, if the load increases, the current through the transistors increased and the emitter bonding wire, being thermally isolated, overheated and burned through or detached. However, in the preferred embodiment, the power transistors are now operated slightly in the active region. Therefore, if the load resistance decreases such that the transistor current would tend to increase, the base drive to the transistors is insufficient to allow the emitter current to increase and, instead, the collector-emitter voltage across the power transistors increases as the power transistors come further out of saturation. Therefore, the current through the power transistors is limited and there is a substantially reduced number of failures due to emitter wire burn through or detachment.

In the preferred embodiment, a load is placed upon output terminal 717 of FIG. 1 so as to cause approximately 50 amps to flow through each power transistor 56a–56f. Potentiometer 151 is then adjusted to give approximately 15 to 18 volts for the collector-to-emitter voltage for the group of transistors. If higher power transistors are used such that each transistor is rated at 100 amps continuous current then, with the load adjusted so that each transistor provides approximately 100 amps, potentiometer 151 is adjusted to provide a 20 volt collecto-to-emitter voltage. Since the base drive current is limited by the setting of potentiometer 151, the emitter current of transistors 56a–56f is limited, thereby preventing destruction of the emitter bonding wire on transistors 56a–56f.

Figure 4:
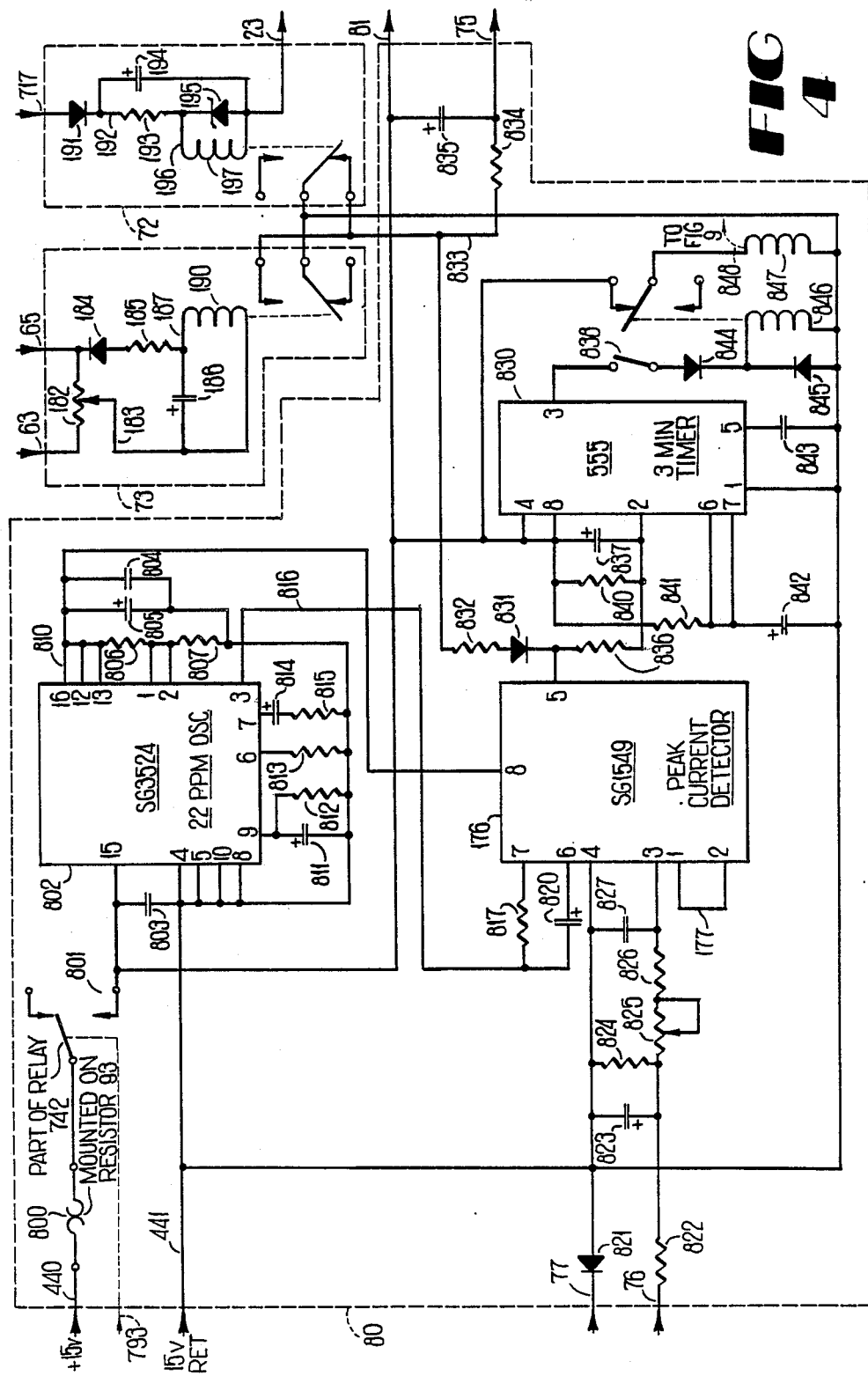
FIG. 4 is a schematic diagram of the current detection circuits of the preferred embodiment.

Turn now to FIG. 4 which is a schematic diagram of peak current detector 80, short circuit detector 72, and over current detector 73. The construction and operation of short circuit detector 72 and over current detector 73 are the same as described in patent application Ser. No. 791,224. The one minor difference being that the anode of diode 191 of short circuit detector 72 is connected to output terminal 717 instead of conductor 71. Briefly stated, relay 197 is energized whenever the output voltage on terminal 717 exceeds a predetermined value, approximately 15 to 20 volts, and is de-energized when the voltage on terminal 717 is below this value, such as when the welding tip is shorted to ground. Short circuit detector 72 disables weld selector station 16 when such a short occurs. Over current detector 73 measures the voltage across resistor 64 of FIG. 1 and disables weld selector station 16 whenever the average output current, which passes through resistor 64, exceeds a predetermined value.

The improvements to peak current detector 80 will now be discussed. Peak current detector 80 disables the output of weld selector station 16 when the peak current output exceeds a predetermined value and, when this shutdown occurs, keeps the weld selector station 16 disabled for a nominal period, three minutes, so as to allow time for the components of weld selector station 16, especially transistors 56a–56f, to return to normal operating temperature.

The plus 15 volt supply conductor 440 is connected to one end of a thermostatically controlled circuit breaker 800. The other end of circuit breaker 800 is connected to the center contact of fan failure relay 742 (FIG. 2). The normally open contact of relay 742 is connected to conductor 801 which applies plus 15 volt power to components 802 and 830. Circuit breaker 800 is mounted on resistor 93 of FIG. 1 and shuts down weld selector station 16 in the event that resistor 93 becomes excessively hot from an excessive ambient temperature or from prolonged heavy duty usage of weld selector station 16. In the event that fan 733 of FIG. 2 fails, fan failure relay 742 will be de-energized thereby opening the contacts, removing operating voltage from peak current detector 80, and shutting down weld selector station 16.

Component 802 is a Silicon General SG3524 regulating pulsewidth modulator, used as a 22 pulse per minute (ppm) oscillator. Component 802 also has an internal 5 volt regulator, the output of which is on pin 16, which provides operating power to component 176. Component 176 is a Silicon General SG1549 current sense latch, used as a peak current detector. Details of operation of components 176 and 802 have been published by and are available from the manufacturer upon request, and have also been described in patent application Ser. No. 791,224. Component 830 is a 555 one shot, configured to operate as a three minute timer. Details of construction and operation of 555-type circuits have been published by numerous manufacturers.

Peak current detector 80 operates in one of two modes depending on the position of switch 838. When switch 838 is in the open position, a peak current which is in excess of the allowable peak current, will cause peak current detector 176 and 22 ppm oscillator 802 to interrupt the welding arc at a 22 ppm rate. When switch 838 is in the closed position, a peak current which is in excess of the allowable peak current, will cause peak current detector 176 and three minute timer 830 to shut down welding selector station 16 for a three minute period. For normal operation switch 838 would be in the closed position. However, if desired, switch 838 may be placed in the open position. However, less protection will be afforded. Switch 838 should always be closed for pulse operation, especially low frequency pulse operation, where the reactance of inductors 62 and 70 is insufficient to limit the output current to a safe level.

It will be noted that component 802 is being utilized to provide two functions: a 5 volt regulator to provide power for component 176; and a 22 ppm oscillator to periodically reset peak current detector 176. In order to achieve these two functions component 802 is connected as follows: conductor 801 is connected to pin 15; 15 volt return conductor 441 is connected to pins 4, 5, 8, and 10; the compensating input on pin 9 is connected to conductor 441 via the parallel combination of a one microfarad capacitor 811 and 2200 ohm resistor 812; a 301 kilohm timing resistor 813 is connected between pin 6 and conductor 441; and the series combination of a 22 microfarad timing capacitor 814 and a 100 ohm current limiting resistor 815 are connected between pin 7 and conductor 441. Resistor 815 is used to limit the discharge current from capacitor 814 and protect the discharge circuit in component 802. A 0.1 microfarad noise bypass capacitor 803 is connected between pins 4 and 15 of component 802. The plus 5 volt output of component 802 on pin 16 is connected by conductor 810 to pins 12 and 13, one end of a 22 microfarad filter capacitor 805, one end of a 0.1 microfarad noise bypass capacitor 804, the power supply input (pin 8) of component 176, and one end of a 50 percent voltage divider formed by 5.1 kilohm resistors 806 and 807. The other end of resistor 807 is connected to conductor 441. The junction of resistors 806 and 807 is connected pins of 1 and 2 of component 802. The reset input/oscillator output (pin 3) of component 802 is connected by conductor 816 to pin 7 of component 176 through a 100 kilohm resistor 817, and to pin 6 of component 176 through a 1 microfarad capacitor 820.

Resistor 813 and capacitor 814 cause component 802 to oscillate at a frequency of approximately 22 ppm. Pin 7 of component 176 is the reset input and pin 6 of component 176 is the peak current detector output.

In normal operation, oscillator 802 will provide reset pulses to peak current detector 176 at the 22 ppm rate. However, if peak current detector 176 has not tripped these reset pulses will have no effect.

If peak current detector 176 is triggered by an excessive current, then pin 6 will go high and reset oscillator 802. The high signal on pin 6 will also attempt to reset peak current detector 176 via pin 7. However, in some cases this signal will be insufficient to provide a proper reset for peak current detector 176. Therefore, oscillator 802 will provide a reset pulse to pin 7 approximately three seconds later. This assures that peak current detector 176 is properly reset within approximately three seconds of being triggered. Peak current detector 176 will also trigger three minute delay timer 830 and allow time for the internal components to return to normal operating temperature.

Peak current detector 176 and short circuit detector 72 also operate to prevent starting an arc when there is a large ball on the end of the welding rod. It will be appreciated that striking an arc with a large ball on the end of the welding rod is undesirable since the ball contains oxides which make for an improper, porous weld. A large ball, with oxidation, would also have a poor contact conductivity. Therefore, in order to strike the arc, the ball must often be placed in contact with the welding surface. This causes a low voltage to appear on conductor 717 and relay 197 drops out thereby shutting down weld selector station 16. The welder must then remove the welding rod and cut off the ball. The welder can then resume the welding operation. Also, if an arc is struck with the ball on the end, a large current will be required to melt the ball and this large current will trigger peak current detector 176, thereby shutting down the operation of weld selector station 16 until the ball has been removed from the welding rod. Therefore, peak current detector 176 and short circuit detector 72 operate to insure that the welder begins the operation with a properly cut welding rod rather than with a welding rod having a large ball on the tip.

As explained in patent application Ser. No. 791,224, peak current detector 176 responds to the current flowing through power transistors 56a–56f of FIG. 1 by measuring the voltage developed across the two tap points on resistor 25 of FIG. 1. These two tap points are brought out as conductors 76 and 77. Circuitry between conductors 76 and 77 and pins 3 and 4 of detector 176 is slightly different from that in the above patent application. The operation of the present circuitry is similar to the original circuitry but provides for a more convenient board layout and slightly improved resistance to noise transients. Conductor 77 is connected to the cathode of diode 821. The anode of diode 821 is connected by a 15 volt return conductor 441 to the negative terminal of 220 microfarad capacitor 823, one end of 470 ohm resistor 822, one end of 0.22 microfarad capacitor 827, and pin 4 of detector 176. Conductor 76 is connected to one end of 470 ohm resistor 822. The other end of resistor 822 is connected to the positive terminal of capacitor 823, the other end of resistor 824, and one end of the series combination of 5,000 ohm potentiometer 825 and 11,000 ohm resistor 826. The other end of this series combination is connected to the other end of capacitor 827 and to pin 3 of detector 176. Although precise values have been given for these components, these are nominal values and may be varied substantially depending upon the peak current response characteristics desired. In practice, the circuit has functioned satisfactorily with resistor 822 ranges of 50 to 2500 ohms, capacitor 823 values between 0 and 1,000 microfarads, and resistor 826 values between 6 and 11,000 ohms. Using maximum values for resistor 822 and capacitor 823 the time constant of the input circuit is approximately 0.4 seconds, where if using the nominal value shown, the time constant is approximately 52 milliseconds. Potentiometer 825, resistor 826 and capacitor 827 have a negligible effect upon the time constant and primarily serve to reduce high frequency noise transients which may not be absorbed by electrolytic capacitor 823. The resistance between pins 3 and 4 of component 176 is approximately 500 ohms, as listed by the manufacturer. Therefore, potentiometer 825 and/or resistor 826 are used to set the actual peak current threshold value at which detector 176 trips. The high common mode inputs of detector 176 are not used and therefore pins 1 and 2 are connected together by conductor 177.

The output of component 176 on pin 5 is an open collector output which is low when detector 176 has been tripped and an open circuit otherwise. Pin 5 is connected to conductor 833 via the series combination of diode 831 and a 24.9 ohm resistor 832. Conductor 833 is connected to the normally open contact of relay 190, the normally closed contact of relay 197, and one end of a 60.4 ohm resistor 834. The other end of resistor 834 is connected to the negative terminal of a 150 microfarad capacitor 835 and to conductor 75. Conductor 81 is connected to the other end of capacitor 835 and to plus 15 volt conductor 801. The center contacts of relays 190 and 197 are connected to 15 volt return conductor 441. Conductors 81 and 75 are connected to the inputs of optocoupler 112 and switching, shut down and driver circuit 37 of FIG. 3. As explained in patent application Ser. No. 791,224, if optocoupler 112 is turned on circuit 37 removes base drive from power transistors 56a–56f thereby shutting down weld selector station 16. Therefore, if the peak current exceeds the allowable peak current then detector 176 will connect pin 5 to pin 4, thereby turning on optoisolator 112. Likewise, if the average current is in excess of the allowable average current, then relay 190 will be activated, connecting conductor 441 to conductor 833, and optoisolator 112 will be turned on, thereby shutting down weld selector station 16. Finally, if the voltage on output terminal 717 is less than the minimum arc welding voltage, approximately 20 volts, relay 197 will be de-energized, thereby connecting conductor 441 to conductor 833 which, in turn, turns on optoisolator 112 and shuts down weld selector station 16. Therefore, circuits 72, 73 and 80 shut down and protect weld selector station 16 in the event of a shorted output terminal, excessive average current, or excessive peak current, respectively, by removing base drive from power transistors 56a–56f.

Output pin 5 of detector 176 is connected to the negated trigger input (pin 2) of timer 830 through a 2.2 kilohm resistor 836. Therefore, whenever current detector 176 is triggered, timer 830 is also triggered. However, blocking diode 831 prevents the operation of relays 190 and 197 from activating three minute timer 830. Pin 2 of timer 830 is connected to 15 volt conductor 801 through the parallel combination of a 6.8 kilohm resistor 840 and a 4.7 microfarad capacitor 387. The filtering action provided by resistors 836 and 840 and capacitor 837 prevents noise transients from triggering timer 830. Fifteen volt conductor 801 is also connected to the negated reset input (pin 4) and the $V_{CC}$ input (pin 8) of timer 830. Conductor 801 is also connected to one end of 10 megohm timing resistor 841. The other end of resistor 841 is connected to threshold (pin 6) and discharge (pin 7) terminals of timer 830 and to one end of 15 microfarad timing capacitor 842. The other end of capacitor 842 is connected to 15 volt return conductor 441. Resistor 841 and capacitor 842 cause timer 830 to have a time constant of approximately three minutes. The three minute time period is not critical and longer or shorter shut down periods may be desirable for different welding applications. The purpose of the timeout period is to assure that any components overheated by the excessive peak current have had time to cool down to normal operating temperature. Therefore, for cooler ambient temperatures or where there is a higher forced air flow shorter times may be used, such as 10 seconds. Also, the timeout period alerts the person performing the welding operation that an excessive current has occurred and that the various controls should be checked for proper setting for the type of welding operation being conducted.

The ground terminal (pin 1) of timer 830 is connected to conductor 441. The control terminal (pin 5) is connected to conductor 441 via a 0.01 microfarad capacitor 843. The output of timer 830 is connected to the anode of diode 844 through switch 838. The cathode of diode 844 is connected to the cathode of diode 845 and one end of time delay relay reed 846. The anode of diode 845 and the other end of relay 846 are connected to conductor 441. Use of shunting diode 845 in parallel with the coil of relay 46 is well known. The use of additional blocking diode 844 to provide further protection for timer 830 is the same as the use of diode 410 of FIG. 8, the operation of which was described in patent application Ser. No. 791,224. The normally closed contact of relay 846 is connected to 15 volt conductor 801. The center contact of relay 846 is connected to one end of the coil of power shut down relay 847. The other end of the coil of relay 847 is connected to 15 volt return conductor 441. Two relays, 846 and 847, are used because of the limited drive capability of timer 830.

When timer 830 is triggered by peak current detector 176, the output of timer 830 on pin 3 will be approximately 15 volts, thereby activating relay 846, which in turn de-energizes relay 847. Relay 847 is connected to FIG. 9 as shown by dashed line 848. Relay 847, as shown more completely in FIG. 9, interrupts the 80 volt supply to STICK & TIG control circuit 30, and pulse-width modulators 32 and 34. This assures that base drive is removed from power transistors 56a–56f for the three timeout period whenever the peak current threshold is exceeded. Of course, if switch 838 is open, then timer 830 will be disconnected from relays 846 and 847 and the three minute timeout will not occur. However, component 176 will still briefly interrupt the welding operation each time an excessive peak current occurs.

Figure 5:
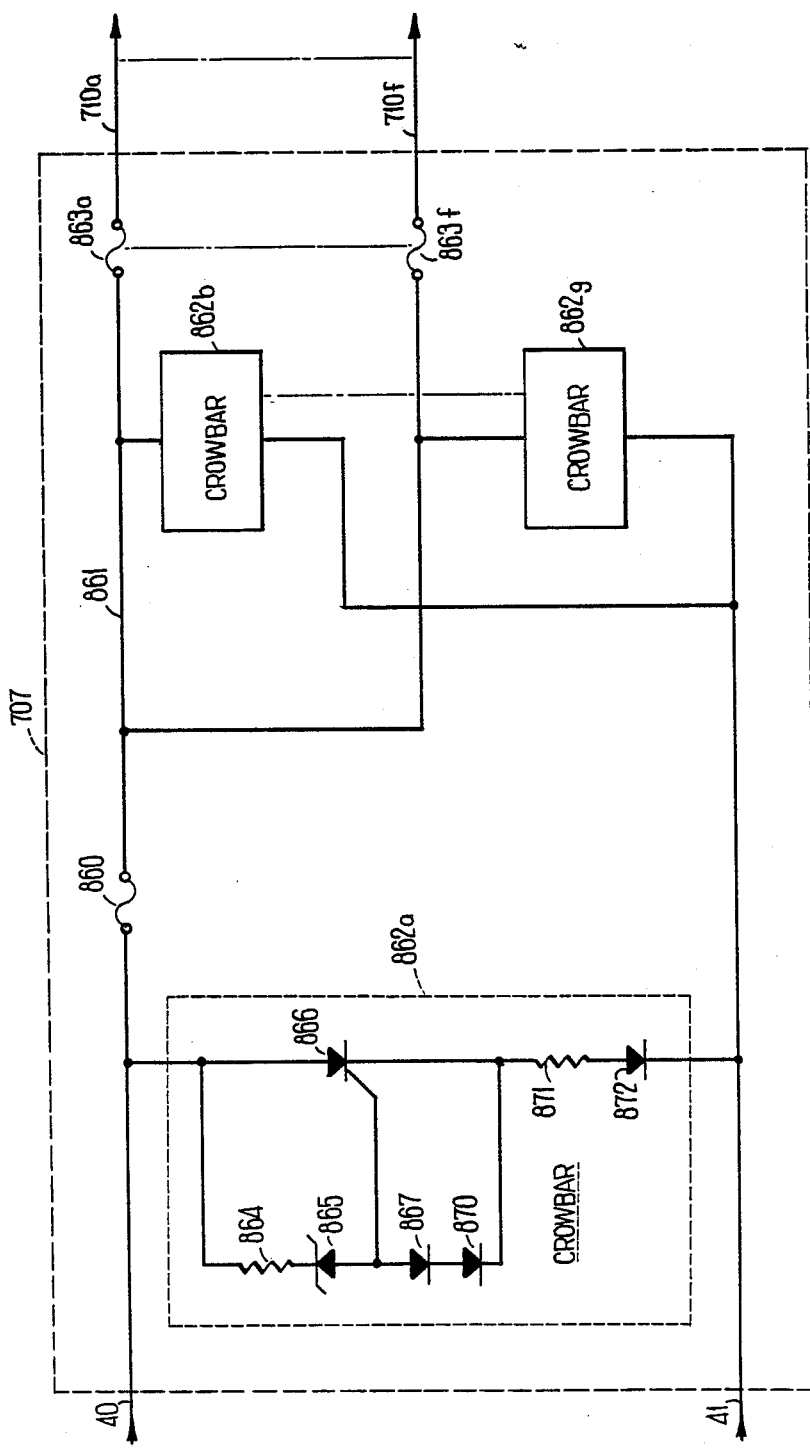
FIG. 5 is a schematic diagram of the transistor protection circuit of the preferred embodiment.

Turn now to FIG. 5 which is a schematic diagram of transistor protection circuit 707. Conductor 40 is the drive output from switching, shutdown and driver circuit 37. Conductor 41 is the base drive return conductor. Conductors 710a–710f are connected to the bases of transistors 56a–56f, respectively, of FIG. 1. Conductor 40 is connected to one end of crowbar circuit 862a and one end of 10 ampere fuse 860. The other end of fuse 860 is connected by conductor 861 to one input of crowbar circuits 862b–862g and one end of 1.5 ampere fuses 863a–863f. The other end of fuses 863a–863f are connected to output conductor 710a–710f, respectively. Conductor 41 is connected to the other input of crowbar circuits 862a–862g. In the preferred embodiment, a crowbar circuit and a fuse are mounted on the same board as the associated transistor. For example, crowbar 862b and fuse 863a are mounted on the same board as transistor 56a. This provides for a faster response from the crowbar circuit and the fuse. Protection circuit 707 protects switching, shutdown and driver circuit 37 and the remaining output transistors 56 in the event that one of the output transistors 56 suffers a failure which shorts the base and collector terminals of that transistor and places the full collector voltage upon the base drive lines 710.

Assume, for example, that transistor 56a suffers such a failure. The full collector voltage will then appear on conductor 710a and, through fuse 863a, on conductor 861 and, through fuse 860, on conductor 40 which goes back to driver circuit 37. The collector voltage on conductor 710a will cause the remaining transistors 56b–56f to be turned on without any means of turning them off, possibly cause destruction of driver circuit 37, and, because transistors 56b–56f are maintained in the on condition, eventually causing the destruction of transistors 56b–56f. However, crowbar circuits 862a–862g and fuses 860 and 863a–863f prevent the failure of transistor 56a from causing the destruction or failure of circuit 37 or transistors 56b–56f. When the full collector voltage is placed on conductor 710a crowbar circuit 862b will be triggered thereby blowing fuse 863a and isolating the base of transistor 56a. Therefore, the shorted basecollector junction of transistor 56a can no longer cause the collector voltage to be applied to the bases of transistors 56b–56f or to the output of circuit 37. Also, the collector voltage on conductor 710a will trigger crowbar circuit 862a which blows fuse 860 thereby removing output drive from transistors 56a–56f. The result is that the failed transistor is isolated by fuse 863a and weld selector station 16 is shut down by the blowing of fuse 860.

If weld selector station 16 were allowed to continue to operate with one power transistor isolated then the remaining power transistors would have to carry the current normally carried by the failed transistor. This would eventually cause the remaining transistors to overheat and be destroyed. However, the blowing of fuse 860 removes drive power from these transistors and shuts down weld selector station 16 until the defective transistor, its associated fuse, and fuse 860 are all replaced. Therefore, the failure of a single transistor does not lead to the failure of all the transistors and of driver circuit 37.

Crowbar circuits 862a–862g are identical and are constructed as follows. The positive input is connected to one end of a 470 ohm resistor 864 and to the anode of a silicon controlled rectifier (SCR) 866. The other end of resistor 864 is connected to the cathode of a 9.1 volt zener diode 865. The anode of diode 865 is connected to the gate of SCR 866 and to the anode of diode 867. The cathode of diode 867 is connected to the anode of diode 870. The anode of diode 870 is connected to the cathode of SCR 866 and to one end of a 0.05 ohm resistor 871. The other end of resistor 871 is connected to the anode of blocking diode 872. The cathode of diode 872 is connected to the negative input terminal of crowbar circuit 862a. The operation of crowbar circuit 862a is conventional: when an excessive voltage is present, such as when the collector voltage is applied to conductor 710a, zener diode 865 will conduct, thereby turning on SCR 866, which will remain on until the current flow through SCR 866 is reduced below the threshold value, such as by the blowing of fuses 860 and 863a. Diodes 867, 870 and 872 prevent crowbar circuit 862a from being activated by voltages which would be applied to conductor 40 during normal operation of circuit 37. In normal operation, a crowbar circuit 862 will trigger when approximately 15 to 17 volts is applied. A single crowbar, such as 862b, may be used in place of crowbars 862b–862g, but the response time will be slowed due to the inherent inductance and capacitance of the conductors, and a lesser degree of protection will be obtained.

Figure 6:
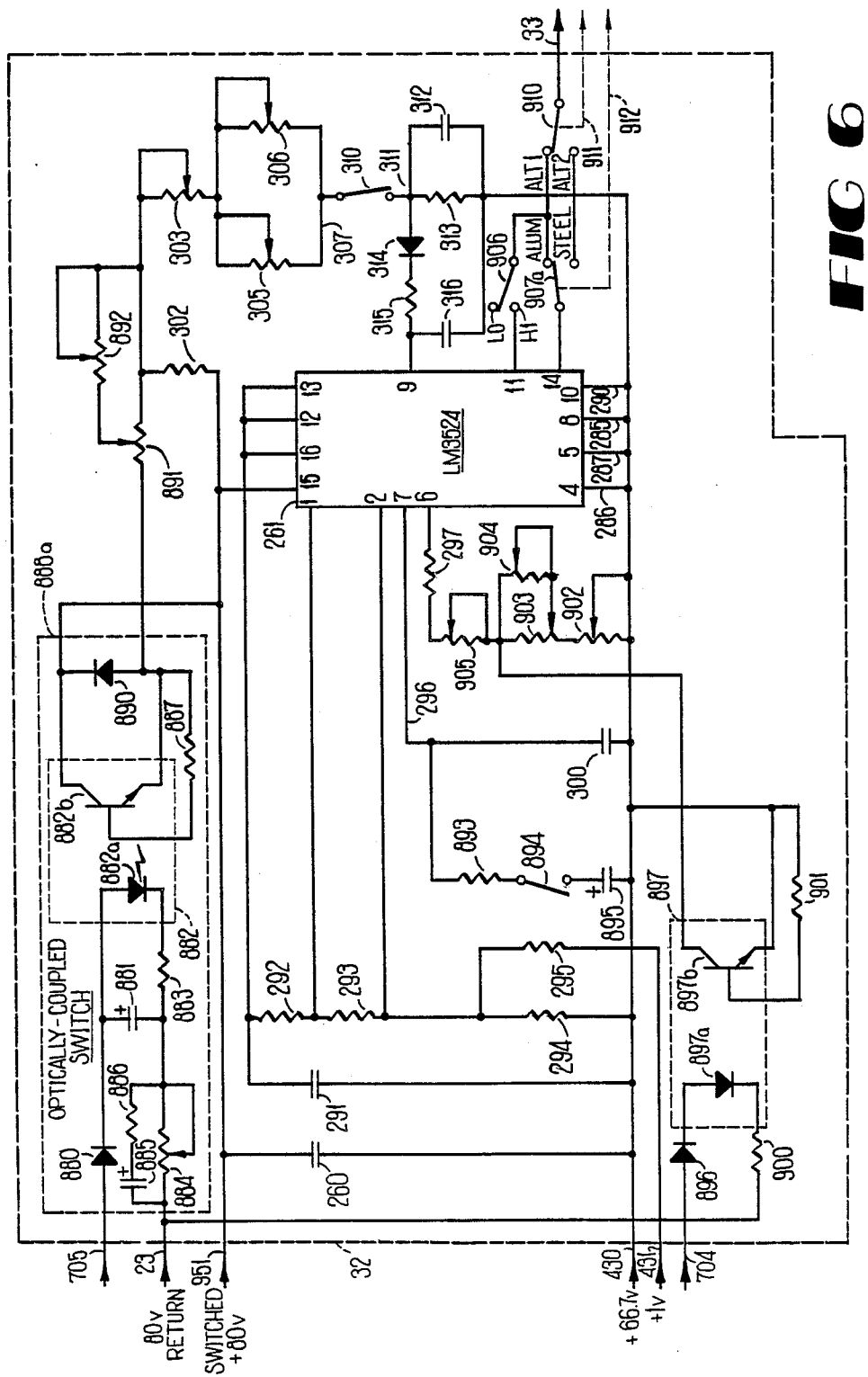
FIG. 6 is a schematic diagram of the low frequency pulsewidth modulator of the preferred embodiment.

Turn now to FIG. 6 which is a schematic diagram of low frequency pulsewidth modulator 32. As explained in patent application Ser. No. 791,224, pulse modulator 32 is a low frequency, input voltage compensated, selectively adjustable pulsewidth modulator. The improvements to pulse modulator 32 are as follows: during striking, and before the arc has been struck, the duty cycle of the output is increased so as to provide a higher output voltage which makes striking the arc easier and, once the arc is struck, reverting to the preselected pulsewidth desired for the actual welding operation; during the striking operation, and before the arc is struck, the frequency of the output of modulator 32 is substantially increased so that, when the arc is struck, inductors 62 and 70 of FIG. 1 will have a higher reactance and prevent the previously mentioned higher striking voltage from causing an initial excessive current flow and, once the arc is struck, the frequency of the output of modulator 32 returns to the value preselected for the welding operation; half frequency or full frequency outputs, which affects the average output voltage, can be selected to tailor the output characteristics to the immediate welding job; and a very low frequency mode is available, which is useful for certain types of welding.

It will be recalled that the voltage on pin 9 of component 261 determines the duty cycle of the output pulse. This voltage on pin 9 is determined by the voltage divider action of resistors 302 and 313, and potentiometers 303, 305 and 306. During the striking operation, resistor 302 is partially or completely bypassed by optically coupled switch 888a and potentiometers 891 and 892, thereby increasing the voltage on pin 9 and increasing the duty cycle of the output pulse. In the preferred embodiment, potentiometer 891 is mounted for access by the welder and potentiometer 892, which is not accessible by the welder, is adjusted to provide the maximum duty cycle which can be selected by the welder using potentiometer 891. One end of potentiometer 892, the wiper of potentiometer 892, and one end of potentiometer 891 are connected to the junction of resistor 302 and potentiometer 303. The other end potentiometer 892 is connected to the wiper contact of potentiometer 891. The other end of potentiometer 891 is connected to the anode of diode 890, the emitter of transistor 882b of optocoupler 882, and one end of one megohm resistor 887. The other end of resistor 887 is connected to the base of transistor 882b. The collector of transistor 882b is connected to the cathode of diode 890 and to switch to plus 80 volt supply line 951. When transistor 882b is turned on, potentiometers 891 and 892 shunt resistor 302, thereby providing a higher voltage on pin 9 of component 261. However, when transistor 882b is turned off, then potentiometers 891 and 892 have no effect on the duty cycle. Conductor 705 is connected to the anode of blocking diode 880. The cathode of diode 880 is connected to the positive terminal of 220 microfarad capacitor 881 and to the anode of emitting diode 882a of optocoupler 882. The cathode of diode 882a is connected to the negative terminal of capacitor 881 through a 4.7 kilohm resistor 883. The negative terminal of capacitor 881 is also connected to one end of a 47 ohm resistor 886, and the wiper contact and one end of 25 kilohm resistor 884. The other end of resistor 886 is connected to the positive terminal of a 22 microfarad capacitor 885. The other end of capacitor 885 and the other end potentiometer 884 are connected to 80 volt return conductor 23.

Figure 8:
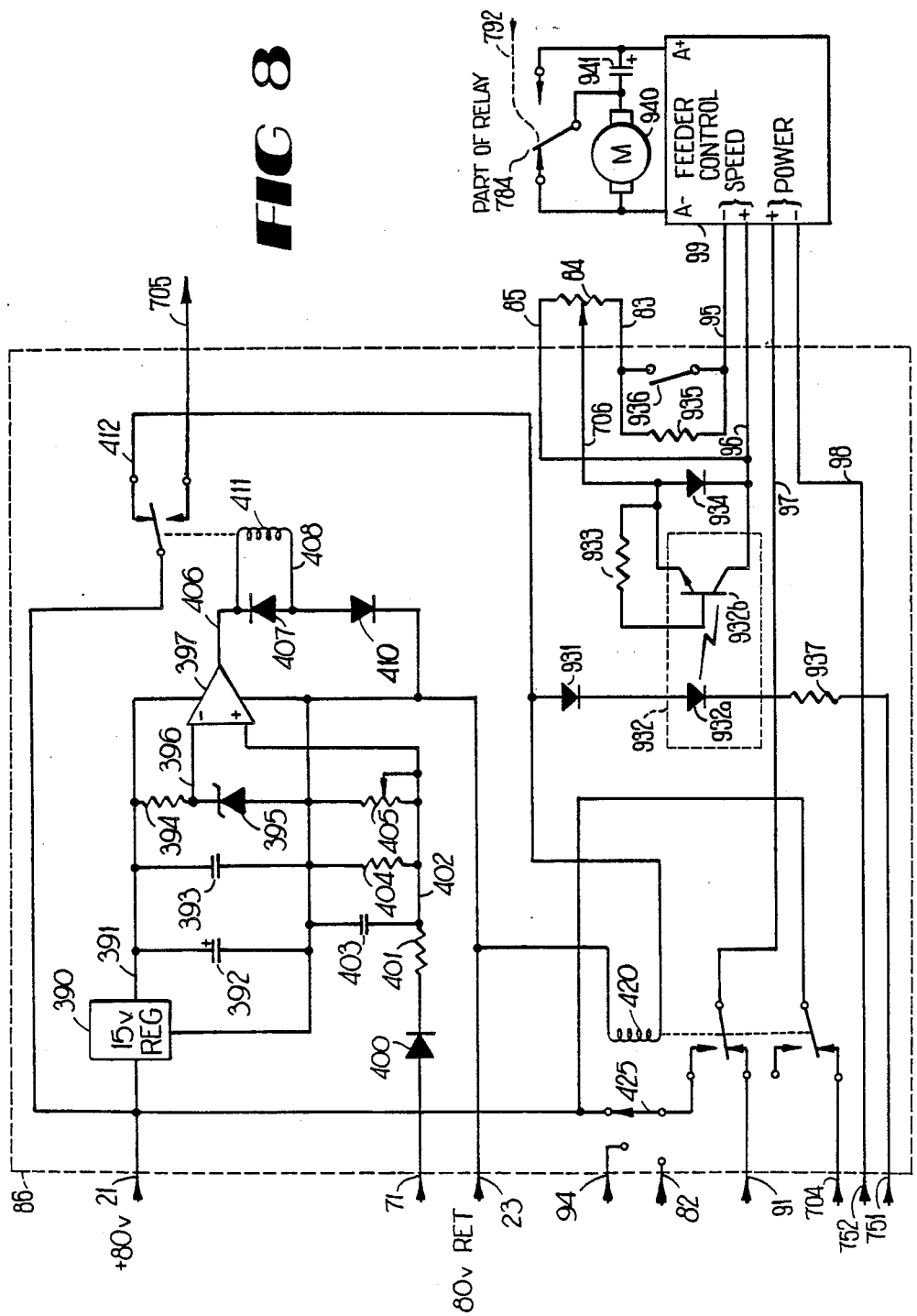
FIG. 8 is a schematic diagram of the high/low feeder voltage switchover control circuit of the preferred embodiment.

During the striking operation, and before the arc is struck, conductor 705, as shown in FIG. 8, is connected to plus 80 volts thereby turning on optocoupler 882 and increasing the duty cycle of the output pulses. After the arc is struck, conductor 705 is isolated from the 80 volt supply, optocoupler 882 turns off, and the duty cycle returns to the duty cycle selected for welding operations. Resistor 883 limits the current through diode 882a. Capacitor 881 provides a filtering action to prevent noise transients from adversely effecting the operation of optocoupler 882. Capacitor 885 provides for a fast turn on for diode 882 and potentiometer 884 provides the discharge path for capacitor 885 and allows selection of the turn on delay time of optocoupler 882. Diode 880 and schottky diode 890 prevent negative transients from harming optocoupler 882.

Component 261 may be either a National Semiconductor LM3524 or a Silicon General SG3524 regulating pulsewidth modulator. The timing resistor input (pin 6) of component 261 is connected to one end of the series string of 2210 ohm resistor 297 and 5 kilohm potentiometer 905. The other end of the series combination is connected to one of potentiometer 903, one end of potentiometer 904, and the collector of tranistor 897b of optoisolator 897. The base of transistor 897b is connected to a 1 megohm resistor 901, to the emitter of transistor 897b and to 66.7 volt conductor 430. The wiper contact and the other end of potentiometer 904 are connected to the wiper contact of potentiometer 903. The other end of potentiometer 903 is connected to 66.7 volt conductor 430 through 22 kilohm potentiometer 902. Conductor 704 is connected to the anode of reverse voltage blocking diode 896. The cathode of diode 896 is connected to the anode of emitting diode 897a of optocoupler 897. The cathode of diode 897a is connected to 80 volt return conductor 23 through a 4.7 kilohm resistor 900.

As will be shown in the discussion of FIG. 8, conductor 704 is connected to the plus 80 volt supply during the striking operation, and is disconnected after the arc has been struck. Therefore, during the striking operation, and before the arc has been struck, optocoupler 897 will be turned on and potentiometers 903, 904 and 902 will be bypassed, thereby leaving only resistor 297 and potentiometer 905 connected to pin 6 of component 261. Potentiometer 905 is adjusted to provide an oscillation frequency of 3 kilohertz for component 261. Therefore, during the striking operation, component 261 oscillates at a higher frequency which, as mentioned above, provides better current limiting action at the instant the arc is struck. Once the arc is struck optocoupler 897 is turned off, potentiometers 902, 903 and 904 now have an effect upon the resistance seen by pin 6 of component 261, and the frequency of oscillation of component 261 for use during welding is set to the desired frequency by potentiometer 903. Potentiometer 902 is adjusted to provide for a maximum oscillation frequency during welding operations and potentiometer 904 is set to provide the minimum frequency which can be used during welding opertions. Potentiometer 903 is generally available to the welder whereas potentiometers 902 and 904 are not accessible by the welder.

The timing capacitor input (pin 7) of component 261 is connected to one end of 0.1 microfarad capacitor 300 and one end of 100 ohm current limiting resistor 893. The other end of resistor 893 is connected through switch 894 to the positive terminal of 22 microfarad capacitor 895. The other end of capacitors 895 and 300 are connected to 66.7 volt conductor 430. When switch 894 is open capacitor 895 is disconnected from the timing circuit and therefore capacitor 300, in conjunction with the resistors connected to pin 6, determine the frequency of oscillation of component 261. When switch 894 is open, component 261 typically provides an oscillation frequency range of 500 to 1500 Hertz and, when optocoupler 897 is turned on, an oscillation frequency of 3000 Hertz. However, when switch 894 is closed, capacitor 895 substantially lowers the oscillation frequency of component 261 and provides a frequency range of 0.2 Hertz to 6.82 Hertz. Also, when switch 894 is closed, the frequency of oscillation of component 261 during the striking operation, before the arc is struck, is approximately 13.6 Hertz.

The emitter A output (pin 11) of component 261 is connected to one end of switch 906. The emitter B (pin 14) output of conductor 261 is connected to the center contact of switch 907a. One contact of switch 907a is connected to the other end of switch 907 and to one contact of switch 380a. The other contact of switch 907a is connected to the other contact of switch 380a. The center contact of switch 380a is connected to conductor 33. Switches 380a and 907a are connected by dash lines 911 and 912, respectively, through the remaining portions of switches 380 and 907, respectively, in FIG. 7.

The position shown for switch 907a is typically used for aluminum welding whereas the other switch position is typically used for steel welding. When switch 907 is in the aluminum welding position, switch 906 may be closed to provide an output pulse frequency which is equal to the oscillation frequency of component 261 or, if switch 906 is open, an output pulse frequency which is one half the oscillation frequency of component 261. This arises because of the structure of component 261. The oscillator of component 261 is used to toggle a flip-flop the Q and negated Q outputs of which are used to drive the two output transistors (A and B) into alternate states (on and off). Therefore, if only the output of transistor B (pin 14) is used the output pulse frequency will be one half of the oscillation frequency but, when switch 906 is closed so that the outputs (pin 11 and pin 14) of both transistors are connected in parallel the output pulse frequency is the same as the oscillation frequency of component 261. It should be noted that the position of switch 906 does not affect the pulsewidth of the two outputs, but determines whether one output, or both, are used. Therefore, in a given time period, there will be one or two pulses, each having the same pulsewidth, and the duty cycle for that time period will be affected accordingly. When switch 906 is closed, since there are now two pulses during the same period that there would have been only one pulse if switch 906 were open, then the average output voltage of weld selector station 16 will increase and, because the frequency of the pulses has doubled, inductor 62 and 70 will provide an improved current limiting action.

Switch 380a provides a choice of two different types of modulation. When switch 380a is in the position shown, high frequency pulsewidth modulator 34 (FIG. 7) will provide output pulses only when the output of low frequency pulsewidth modulator 32 is a logic 1. When switch 380a is in the other position the outputs of low frequency pulsewidth modulator 32 and high frequency modulator 34 are connected in parallel so that the output pulses provided by low frequency modulator 32 are interspersed by the output pulses provided by high frequency modulator 34. It will be noted that switch 906 only has an affect when switch 30a is in the position shown.

Figure 7:
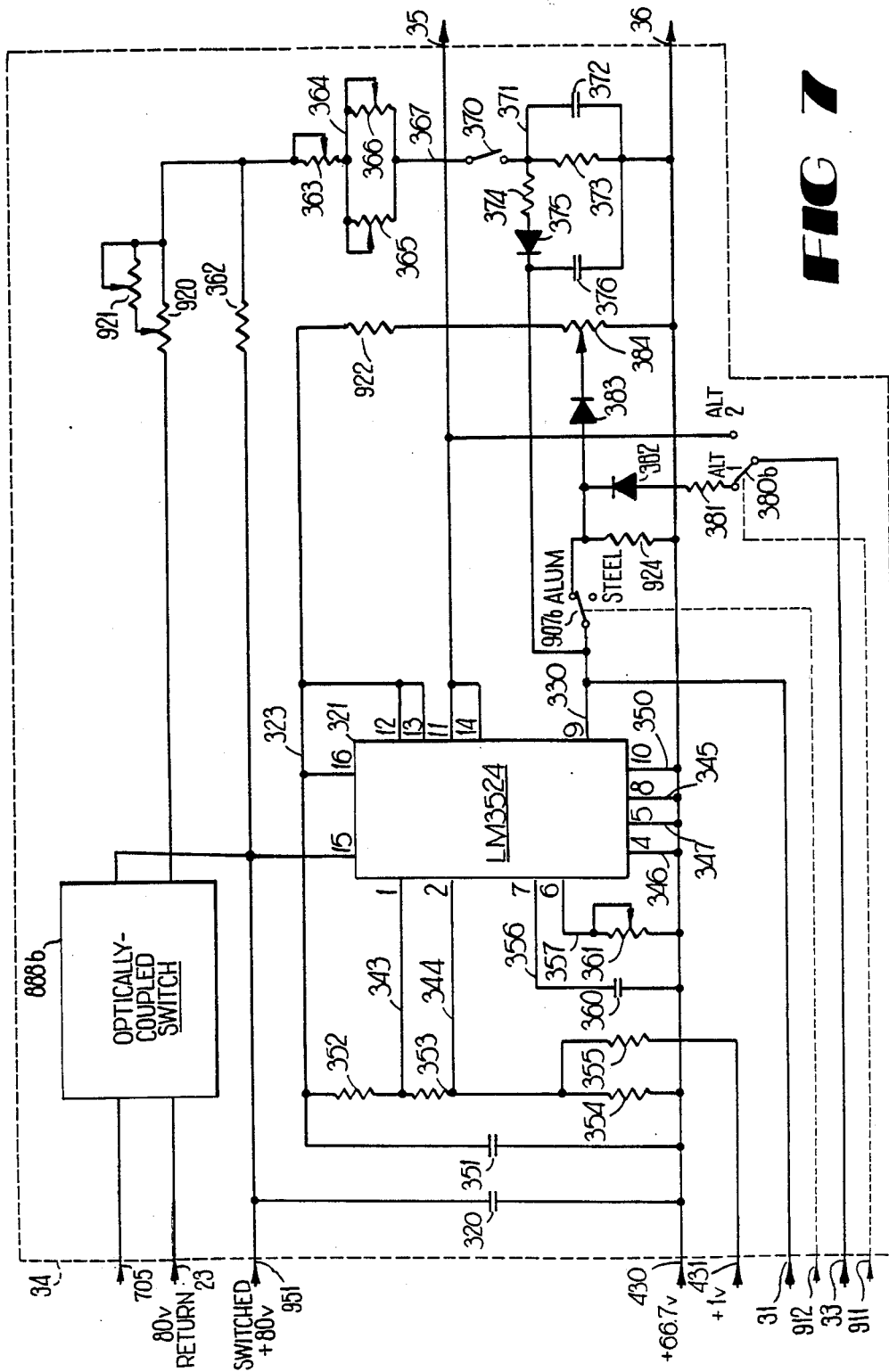
FIG. 7 is a schematic diagram of the high frequency pulsewidth modulator of the preferred embodiment.

Turn now to FIG. 7 which is a schematic diagram of high frequency pulsewidth modulator 34. The basic principles of construction and operation of high frequency pulsewidth modulator 34 are the same as described in patent application Ser. No. 791,224. However, like low frequency pulsewidth modulator 32, high frequency pulsewidth modulator 34 has an optically coupled switch 888b which, when conductor 705 is connected to the plus 80 volt supply, turns on and allows potentiometers 920 and 921 to shunt resistor 362, thereby increasing the duty cycle of the output of component 321. During the striking operation, switch 888b and potentiometers 920 and 921 increase the duty cycle of the output pulses and therefore increase the average output voltage which allows for an improved striking operation. A 1210 ohm resistor 922 has been inserted between conductor 323 and the top end of dead band adjustment potentiometer 384. It will be recalled that dead band adjustment potentiometer 384 sets the maximum possible duty cycle of the output pulses of component 321. Resistor 922 has been added in order to limit the range of adjustment provided by potentiometer 384.

Dashed line 911 indicates the connection from switch 380a of FIG. 6 to switch 380b. In this embodiment, the value of resistor 381 has been changed to 100 ohms to provide for improved performance characteristics when low frequency pulsewidth modulator 32 is used to turn pulsewidth modulator 34 on and off. Also, a 200 ohm resistor 924 has been added between the anode of diode 383 and 66.7 volt conductor 430. This resistor was not in the original high frequency pulsewidth modulator 34 circuit and it has been found that the frequency range available for pulsewidth modulator 34 was somewhat dependent upon the particular component 321 used. The addition of resistor 924 corrects this problem so that the full frequency range is available and is not dependent upon the characteristics of a particular component 321.

Switch 907b has also been added between conductor 330 and the anode of diode 383. When switch 907b is in the position shown, which is used primarily for welding aluminum, component 321 is responsive to the setting of dead band adjustment potentiometer 384 and, when switch 380b is in the position shown, is also responsive to the output of low frequency pulsewidth modulator 32. When switch 907b is in the other position, the output of component 321 is dependent only upon the output of STICK & TIG control 30. This other position for switch 907b is generally used for welding steel.

Turn now to FIG. 8, which is a schematic diagram of the high-low voltage switchover circuit. The basic construction and principles of operation of switchover circuit 86 are as previously described in patent application Ser. No. 791,224. More precisely, when conductor 17 has no voltage (as in a short) or a low voltage (an arc is being sustained) then relay 411 will not be activated, but when a voltage higher than an arc sustaining voltage (such as the striking voltage) is present on conductor 71 then operational amplifier 397 will energize relay 411. The improvements to switchover circuit 86 are described below.

The normally open contact of relay 411 is now connected to conductor 705 which, it will be recalled, goes to FIG. 6 (low frequency pulsewidth modulator) and FIG. 7 (high frequency pulsewidth modulator). When a high voltage is present on conductor 71, such as during the arc striking operation, but before the arc is struck, relay 411 will be energized thereby connecting conductor 705 to plus 80 volt connector 21, turning on optocouplers 888a and 888b (FIGS. 6 and 7, respectively). This causes pulsewidth modulators 32 and 34 to operate at the higher duty cycles and frequencies, previously described, which assist in the arc striking operation.

Once the arc is struck relay 411 is de-energized thereby disconnecting conductor 705 and then connecting conductor 412 to 80 volt conductor 21. Conductor 412, as in the original circuit, is still connected to transfer relay 420. When a low or no voltage is present on conductor 71, relay 420 is activated thereby providing the voltage tap selected by switch 425 to feeder control circuit 99. This causes motor 940 to operate at the desired speed for welding operations. However, when a higher voltage is present on conductor 71, such as before the arc is struck, relay 411 will be energized, relay 420 will be de-energized, and conductor 97 will be connected to conductor 91 thereby providing the correct voltage to motor 940 for the speed desired during the preliminary set up and arc striking operation. One change has also been made with respect to the connections for switch 425. Previously, in the position shown, switch 425 was connected to conductor 71. However, switch 425 is now connected to plus 80 volt conductor 21. This provides a higher operating voltage for feeder control 99 in cases where the arc voltage is too low to provide for reliable operation of motor 940.

Relay 420 now also has one additional set of contacts (shown as the lower set of contacts). The center contact of this set of contacts is connected to plus 80 volt conductor 21. The normally closed contact set of contacts is connected to conductor 704 which is connected through diode 896 to optocoupler 897 of FIG. 6 (low frequency pulsewidth modulator 32). When conductor 71 has a high voltage present, such as during the striking operation, relay 420 will be de-energized and conductor 704 will be connected to plus 80 volt conductor 21. This turns on optocoupler 807 of FIG. 6 thereby causing low frequency pulsewidth modulator 32 to provide the higher pulse frequency desired for the striking operation. Once an arc is struck, the voltage on conductor 71 will drop below the threshold voltage, thereby causing relay 420 to be energized and disconnecting conductor 704 from conductor 21. This causes low frequency pulsewidth modulator 32 to switch to the frequency set for the welding operation. Referring briefly to FIG. 2, if the first option 753 is used, conductor 704 may be connected to the normally open contact shown. It will be recalled that the first option 753 is one of two options provided to increase the speed of cooling fan motor 733 when welding operations are actually in progress.

The motor speed control circuit of switchover control circuit 86 has also been modified. Conductor 412 is connected to the anode of reverse voltage blocking diode 931. The cathode of diode 931 is connected to the anode of emitting diode 932a of optocoupler 932. The cathode of 932a is connected through a 4.7 kilohm resistor 937 to conductor 751. The base of transistor 932b of optocoupler 932 is connected by 1 megohm resistor 933 to the emitter of transistor 932b. The emitter of transistor 932b is connected to the anode of reverse voltage protection schottky diode 934 and to the wiper contact of speed control potentiometer 84. The collector of transistor 932b is connected to the cathode of 934, to one end of potentiometer 84, and, via conductor 96, to one of the speed control inputs on feeder control circuit 99. Another end of potentiometer 84 is connected by the parallel combination of 2.2 kilohm resistor 935 and speed vernier switch 936 to the other speed control input of feeder control 99. When switch 936 is closed, resistor 935 is bypassed so that speed control potentiometer 84 operates over its normal range. However, when switch 936 is open, resistor 935 limits the range of control of potentiometer 84 thereby causing potentiometer 84 to cause a more fine (vernier) adjustment of the speed of motor 940.

When a high voltage is present on conductor 71, such as during the striking process, relay 411 will be energized thereby causing optocoupler 932 to be turned off, and placing the full resistance of potentiometer 84 across the speed control inputs of feeder control 99. The speed of motor 940 is inversely proportional to the resistance connected across the speed control inputs of control circuit 99. Therefore, during the striking operation, motor 940 operates at a reduced speed which is desirable for set up and striking operations. However, once the arc is struck, relay 412 will be de-energized, thereby turning on optocoupler 932 and shorting out the portion of potentiometer 84 between its center contact and conductor 85. This provides for a higher speed for feeder control motor 940, as adjusted by the position of the wiper on potentiometer 84, during the actual welding operation. The control of the speed of motor 940 is therefore essentially identical to that described in patent application Ser. No. 791,224, but has been implemented via optocoupler 932 instead of via an additional relay.

Feeder control circuit 99 has two output terminals for providing drive power to feeder motor 940. The negative output terminal (A−) is connected to one brush of motor 940 and to the normally closed contact of a set of contacts of relay 784. The other brush of motor 940 is connected to one end of one microfarad surge absorbing capacitor 941 and to the center contact of this set of contacts of relay 784. The positive terminal (A+) is connected to the other terminal of capacitor 941 and to the normally open contact of this set of contacts of relay 784. The connection and operation of relay 784 is as described in FIG. 2. When wire feeding is not desired, relay 784 is in the de-energized position shown, which deprives motor 940 of operating power and further uses motor 940 as a brake in the event that motor 940 was previously operating. When wire feeding operation is desired, relay 784 is energized and operating power is applied to motor 940.

Figure 9:
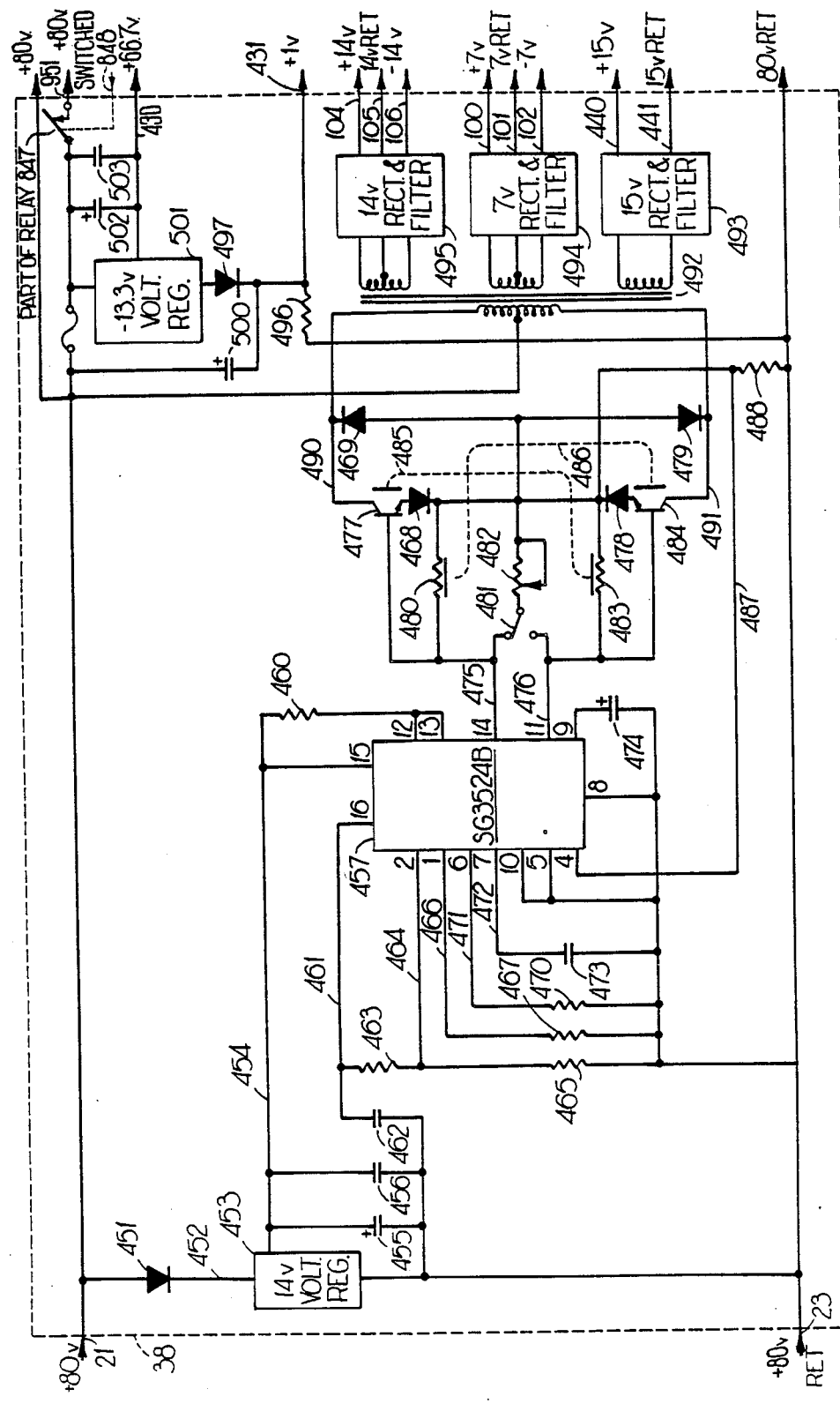
FIG. 9 is a schematic diagram of the power supply circuits of the preferred embodiment.

Turn now to FIG. 9 which is a schematic diagram of the circuit power supplies 38. The description and operation of circuit power supplies 38 is essentially as that described in patent application Ser. No. 791,224. The improvements to the power supplies 38 consist of the addition of fuse 950, to protect voltage regulator 501, and a set of contacts of relay 847, which switch operating power to STICK & TIG control 30, low frequency pulse modulator 32, and high frequency pulse modulator 34. Plus 80 volt conductor 21 is connected through fuse 950 to conductor 952. Conductor 952 is selectably connected by a set of contacts of relay 847 to switched plus 80 volt conductor 951. Fuse 950 protects voltage regulator 501 in the event that circuits 30, 32, or 34 draw too much current. The set of contacts shown for relay 847 interrupt operating power to circuits 30, 32, and 34 if the three minute time delay cooling off period has been selected and a peak current in excess of the allowable peak current occurs. The operation of relay 847 is described more fully in conjunction with FIG. 4.

Figure 10:
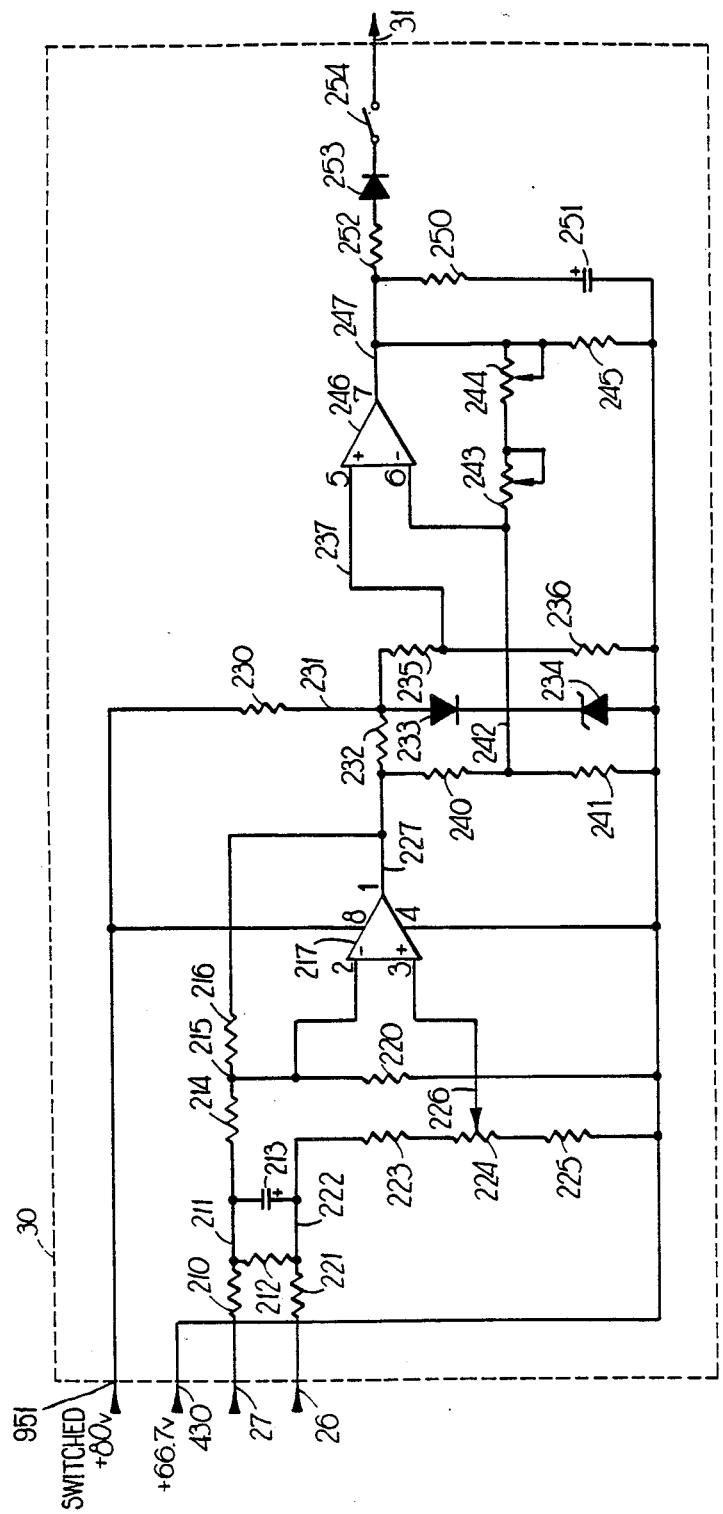
FIG. 10 is a schematic diagram of the STICK & TIG control circuit of the preferred embodiment. Detailed Description Turning now to the drawing, in which like numerals represent like components throughout the several figures, the preferred embodiment of the present invention will be described. Details of construction and operation of weld selector station 16 and its components are provided in U.S. patent application Ser. No. 791,224, filed Oct. 25, 1985, by Malcolm T. Gilliland, entitled "Distributed Station Welding System", which is incorporated herein by reference. Wherever possible, the component name and number used in the figures are the same as that used in patent application Ser. No. 791,224.

Turn now to FIG. 10 which is a schematic diagram of STICK & TIG circuit 30. The construction and principles of operation of circuit 30 are the same as described in patent application Ser. No. 791,224. Circuit 30 monitors the current output and provides a current feedback signal which controls the pulsewidth of the output of high frequency modulator 34. However, circuit 30 now receives operating power via switched 80 volt conductor 951 instead of via 80 volt conductor 21. This provides for the shut down of circuit 30 in the event that the three minute time delay cool down period is selected and a peak current in excess of the allowable peak current has occurred.

The table below lists several different modes of welding operations and the nominal switch settings for these operations. It must be emphasized that these switch settings are merely nominal and that other switch settings may be desirable depending upon the particular type of welding being performed, the type of material being welded, the thickness of the material being welded, the diameter of the welding rod etc. Also, depending upon the range of welding operations that may be performed, it is often desirable to make some of the switches interlocking so that certain features cannot be activated at the same time other features are activated. For example, switches 310 and 254 may be interlocking so that STICK & TIG control 30 and low frequency pulse modulator 32 cannot be activated at the same time. Also, switches 370 and 380 may be interlocking so that high frequency pulse modulator 34 cannot be activated when low frequency pulse modulator 32 is activated and switch 380 is in the ALT2 position. The decision to make switches interlocking or non-interlocking and, if interlocking, which switches should be interlocking, will depend upon the number of different options which are to be made available to the welder performing the welding operation.

| | NOMINAL SWITCH SETTINGS | | | | | |
|---|---|---|---|---|---|---|
| | Switch No. | | | | | |
| MODE | 254 STICK & TIG CONTROL | 310 LF PWM | 370 HF PWM | 380 ALT1/ ALT2 | 715 OUTPUT SEL. | 794, 795 — |
| MIG | OFF | OFF | ON | X | MIG & PULSE | OPEN/ CLOSED |
| TIG | OFF | OFF | ON | X | STICK & TIG | OPEN/ CLOSED |
| STICK (Mode 1) | ON | OFF | OFF | X | STICK & TIG | CLOSED/ OPEN |
| STICK (Mode 2) | ON | OFF | ON | X | STICK & TIG | OPEN/ CLOSED |
| CHOPPED PULSE | OFF | ON | ON | ALT1 | MIG & PULSE | OPEN/ CLOSED |
| UN- CHOPPED PULSE | OFF | ON | OFF | ALT2 | MIG & PULSE | OPEN/ CLOSED |

From the detailed description above, it will be appreciated that the present invention describes an improved weld selector station having improved self protection features, improved arc striking and switchover characteristics, great versatility and a longer operating time between maintenance periods.

Also, based upon the foregoing detailed description, numerous variations and modifications to the present invention will be apparent to those skilled in the art. Therefore, the scope of the present invention is to be limited only by the claims below.

I claim:

1. In a welding station comprising an output stage and a driver stage for providing drive power to said output stage, said output stage comprising at least one transistor, said transistor having a drive input terminal, a power supply input terminal, an output point, and a bonding wire connecting said output point to an output terminal, a method of reducing the probability of said bonding wire detaching or burning through due to an instantaneous current flow through said transistor, comprising the steps of:
 (a) connecting a load to said output terminal;
 (b) adjusting said load to cause a predetermined output current to flow through said output stage;
 (c) adjusting said drive power to cause a predetermined voltage to be present between said power supply input terminal and said output terminal; and
 (d) repeating steps (b) and (c) as necessary to simultaneously obtain said predetermined output current and said predetermined voltage;
wherein said transistor operates slightly in an active mode at said predetermined output current so that, for loads tending to cause said output current to exceed said predetermined output current, said drive power is insufficient to support said output current and said bonding wire is protected.

2. An improved arc welding station, comprising:
 control means for selecting desired parameters for a welding operation;
 drive means responsive to said control means for providing drive power, said drive power not exceeding a first predetermined value;
 output means responsive to said drive power for providing an output current to said welding operation, said output means comprising a transistor, said transistor having a drive input terminal connected to said drive means, a power supply input terminal connected to a power source, an output point, and a conductor connecting said output point to an output terminal, said output terminal being connected to said welding operation;
 first current detection means responsive to a peak value of said output current exceeding a first predetermined value for causing said drive power to be removed from said output means; and
 second current detection means responsive to an average value of said output current exceeding a second predetermined value for causing said drive power to be removed from said output means;
 wherein said first predetermined value is adjusted so that said output means cannot conduct an output current greater than a second predetermined value, said second predetermined value being less than an amount necessary to cause damage to or detachment of said conductor.

3. The improved arc welding station of claim 2 wherein said output means comprises a plurality of said transistor connected in parallel.

4. The improved arc welding station of claim 3 wherein said first predetermined value causes a specified voltage to appear between said power supply input terminal and said output terminal when a specified current is flowing through said output means.

5. The improved arc welding station of claim 2 wherein said first predetermined value causes a specified voltage to appear between said power supply input terminal and said output terminal when a specified current is flowing through said output means.

6. The improved arc welding station of claim 2 wherein said conductor comprises a bonding wire.

7. The improved arc welding station of claim 2 and further comprising:
short circuit detection means responsive to a low output voltage being provided by said arc welding station for causing said drive power to be removed from said output means.

8. The improved arc welding station of claim 2 and further comprising:
timing means responsive to said first current detection means detecting said peak value of said output current exceeding said first predetermined value for causing said drive power to be removed from said output means for a predetermined period.

9. The improved arc welding station of claim 2 and further comprising:
means for providing a reset signal to said first current detection means.

10. An improved arc welding station, comprising:
control means for selecting desired parameters for a welding operation;
drive means responsive to said control means for providing drive power, said drive power being limited to a predetermined value;
output means responsive to said drive power for providing an output current to said welding operation, said output means comprising a transistor having a drive input terminal connected to said drive means, a power supply input terminal connected to a power source, an output point, an output terminal for providing said output current to said welding operation, and a conductor connecting said output point to said output terminal;
first current detection means responsive to a peak value of said output current exceeding a first predetermined value for causing said drive power to be removed from said output means; and
second current detection means responsive to an average value of said output current exceeding a second predetermined value for causing said drive power to be removed from said output means;
wherein said predetermined value of said drive power prevents said output current from reaching a value which causes detachment of or damage to said conductor.

11. The improved arc welding station of claim 10 wherein said output means comprises a plurality of said transistor connected in parallel.

12. The improved arc welding station of claim 11 wherein said predetermined value causes a specified voltage drop between said power supply input terminal and said output terminal when a specified current is flowing through said output means.

13. The improved arc welding station of claim 10 wherein said predetermined value causes a specified voltage drop between said power supply input terminal and said output terminal when a specified current is flowing through said output means.

14. The improved arc welding station of claim 10 wherein said conductor comprises a bonding wire.

15. The improved arc welding station of claim 10 and further comprising:
short circuit detection means responsive to a low output voltage being provided by said arc welding station for causing said drive power to be removed from said output means.

16. The improved arc welding station of claim 10 and further comprising:
timing means responsive to said first current detection means detecting said peak value of said output current exceeding said first predetermined value for causing said drive power to be removed from said output means for a predetermined period.

17. The improved arc welding station of claim 10 and further comprising:
means for providing a reset signal to said first current detection means.

18. An improved arc welding station, comprising:
control means for selecting desired parameters for a welding operation;
drive means responsive to said control means for providing drive power;
output means responsive to said drive power for providing an output current to a welding operation;
said drive power being sufficient to cause said output means to operate near a saturated state when said output current is less than a predetermined output current; and
said drive power being limited to a predetermined drive power so that a condition tending to increase said output current in excess of said predetermined output current causes said output means to operate less near said saturated state and more toward an active state.

19. The improved arc welding station of claim 18 wherein said output means comprises a plurality of transistors.

20. The improved arc welding station of claim 19 wherein said predetermined output current is insufficient to cause damage to or detachment of a conductor in any transistor of said plurality of transistors.

21. The improved arc welding station of claim 20 wherein said conductor comprises a bonding wire.

22. The improved arc welding station of claim 18 wherein said predetermined output current is insufficient to cause damage to or detachment of a conductor in said output means.

23. The improved arc welding station of claim 22 wherein said conductor comprises a bonding wire.

24. The improved arc welding station of claim 18 and further comprising:
current detection means responsive to a peak value of said output current exceeding a predetermined value for causing said drive power to be removed from said output means.

25. The improved arc welding station of claim 24 and further comprising:
short circuit detection means responsive to a low output voltage being provided by said arc welding station for causing said drive power to be removed from said output means.

26. The improved arc welding station of claim 24 and further comprising:
timing means responsive to said current detection means detecting said peak value of said output current exceeding said predetermined value for causing said drive power to be removed from said output means for a predetermined period.

27. The improved arc welding station of claim 24 and further comprising:

means for providing a reset signal to said current detection means.

28. The improved arc welding station of claim 18 and further comprising:

current detection means responsive to an average value of said output current exceeding a predetermined value for causing said drive power to be removed from said output means.

29. The improved arc welding station of claim 18 and further comprising:

first current detection means responsive to a peak value of said output current exceeding a first predetermined value for causing said drive power to be removed from said output means; and second current detection means responsive to an average value of said output current exceeding a second predetermined value for causing said drive power to be removed from said output means.

30. The improved arc welding station of claim 29 and further comprising:

short circuit detection means responsive to a low output voltage being provided by said arc welding station for causing said drive power to be removed from said output means.

31. The improved arc welding station of claim 29 and further comprising:

timing means responsive to said first current detection means detecting said peak value of said output current exceeding said first predetermined value for causing said drive power to be removed from said output means for a predetermined period.

32. The improved arc welding station of claim 29 and further comprising:

means for providing a reset signal to said first current detection means.

33. The improved arc welding station of claim 18 and further comprising:

short circuit detection means responsive to a low output voltage being provided by said arc welding station for causing said drive power to be removed from said output means.

34. An improved arc welding station, comprising:

control means for selecting desired welding parameters;

drive means responsive to said control means for providing drive power;

limiting means connected to said drive means for limiting said drive power to a predetermined maximum drive power;

output means responsive to said drive power for providing a desired maximum output current to a welding operation;

wherein said predetermined maximum drive power is sufficient to allow said output means to provide said desired maximum output current to said welding operation but insufficient to allow said output means to provide an output current larger than said desired maximum output current; and wherein said predetermined maximum drive power causes said output means to operate slightly out of a saturated operating region when said output means is providing said desired maximum output current.

35. The improved arc welding station of claim 34 wherein said limiting means comprises a resistor.

36. The improved arc welding station of claim 34 wherein said output means comprises a transistor.

37. The improved arc welding station of claim 36 wherein said predetermined maximum drive power limits said output current to a value which does not cause damage to or detachment of a conductor in said transistor.

38. The improved arc welding station of claim 37 wherein said conductor comprises a bonding wire.

39. The improved arc welding station of claim 34 and further comprising:

current detection means responsive to a peak value of said output current exceeding a predetermined value for causing said drive power to be removed from said output means.

40. The improved arc welding station of claim 39 and further comprising:

short circuit detection means responsive to a low output voltage being provided by said arc welding station for causing said drive power to be removed from said output means.

41. The improved arc welding station of claim 39 and further comprising:

timing means responsive to said current detection means detecting said peak value of said output current exceeding said predetermined value for causing said drive power to be removed from said output means for a predetermined period.

42. The improved arc welding station of claim 39 and further comprising:

means for providing a reset signal to said current detection means.

43. The improved arc welding station of claim 34 and further comprising:

current detection means responsive to an average value of said output current exceeding a predetermined value for causing said drive power to be removed from said output means.

44. The improved arc welding station of claim 34 and further comprising:

short circuit detection means responsive to a low output voltage being provided by said arc welding station for causing said drive power to be removed from said output means.

45. In a welding power supply having a control means for selecting desired welding parameters, a drive means responsive to said control means for providing drive power, and an output means responsive to said drive power for providing an output current to a welding operation, an improved method for operating said welding power supply, comprising the steps of:

selecting a desired maximum output current, said desired maximum output current being less than a current required to detach or damage a conductor in said output means;

limiting said drive power to a value which prevents said output means from providing an output current greater than said desired maximum output current;

monitoring said output current;

removing said drive power from said output means if a peak value of said output current exceeds a first predetermined value; and removing said drive power from said output means if an average value of said output current exceeds a second predetermined value.

46. The improved method of claim 45 wherein said conductor is a bonding wire.

47. The method of claim 45 and further comprising the steps of:
   monitoring an output voltage provided to said welding operation; and
   removing said drive power from said output means if said output voltage is less than a predetermined voltage.

48. The method of claim 45 wherein said drive power is removed from said output means for a predetermined period if said peak value of said output current exceeds said first predetermined value.

49. The method of claim 45 and further comprising the steps of:
   monitoring an output voltage provided to said welding operation; and
   removing said drive power from said output means if said output voltage is less than a predetermined voltage.

50. In a welding power supply having a control means for selecting desired welding parameters, a drive means responsive to said control means for providing drive power, and an output means responsive to said drive power for providing an output current to a welding operation, an improved method for operating said welding power supply, comprising the steps of:
   selecting a desired maximum output current, said desired maximum output current being less than a current required to detach or damage a conductor in said output means; and
   limiting said drive power to a value which causes said output means to operate slightly out of a saturated mode when said output means is providing said desired maximum output current.

51. The improved method of claim 50 wherein said conductor is a bonding wire.

52. The method of claim 50 and further comprising the steps of:
   monitoring said output current; and
   removing said drive power from said output means if a peak value of said output current exceeds a predetermined value.

53. The method of claim 52 and further comprising the steps of:
   monitoring an output voltage provided to said welding operation; and
   removing said drive power from said output means if said output voltage is less than a predetermined voltage.

54. The method of claim 52 wherein said drive power is removed from said output means for a predetermined period if said peak value of said output current exceeds said predetermined value.

55. The method of claim 50 and further comprising the steps of:
   monitoring said output current; and
   removing said drive power from said output means if an average value of said output current exceeds a predetermined value.

56. The method of claim 50 and further comprising the steps of:
   monitoring said output current;
   removing said drive power from said output means if a peak value of said output current exceeds a first predetermined value; and
   removing said drive power from said output means if an average value of said output current exceeds a second predetermined value.

57. The method of claim 56 and further comprising the steps of:
   monitoring an output voltage provided to said welding operation; and
   removing said drive power from said output means if said output voltage is less than a predetermined voltage.

58. The method of claim 56 wherein said drive power is removed from said output means for a predetermined period if said peak value of said output current exceeds said first predetermined value.

59. The method of claim 50 and further comprising the steps of:
   monitoring an output voltage provided to said welding operation; and
   removing said drive power from said output means if said output voltage is less than a predetermined voltage.

60. An improved arc welding station, comprising:
   control means for selecting desired welding parameters;
   drive means responsive to said control means for providing drive power;
   limiting means connected to said drive means for limiting said drive power to a predetermined maximum drive power;
   output means responsive to said drive power for providing a desired maximum output current to a welding operation;
   first current detection means responsive to a peak value of said output current exceeding a first predetermined value for causing said drive power to be removed from said output means; and
   second current detection means responsive to an average value of said output current exceeding a second predetermined value for causing said drive power to be removed from said output means;
   wherein said predetermined maximum drive power is sufficient to allow said output means to provide said desired maximum output current to said welding operation but insufficient to allow said output means to provide an output current larger than said desired maximum output current.

61. The improved arc welding station of claim 60 and further comprising:
   short circuit detection means responsive to a low output voltage being provided by said arc welding station for causing said drive power to be removed from said output means.

62. The improved arc welding station of claim 60 and further comprising:
   timing means responsive to said first current detection means detecting said peak value of said output current exceeding said first predetermined value for causing said drive power to be removed from said output means for a predetermined period.

63. The improved arc welding station of claim 60 and further comprising:
   means for providing a reset signal to said first current detection means.

* * * * *